US012585037B2

(12) United States Patent
Li et al.

(10) Patent No.: US 12,585,037 B2
(45) Date of Patent: Mar. 24, 2026

(54) METHOD AND SYSTEM FOR AUGMENTED INVERSION AND UNCERTAINTY QUANTIFICATION FOR CHARACTERIZING GEOPHYSICAL BODIES

(71) Applicant: ExxonMobil Upstream Research Company, Spring, TX (US)

(72) Inventors: Dongzhuo Li, Katy, TX (US); Huseyin Denli, Basking Ridge, NJ (US); Cody MacDonald, Houston, TX (US); Kyle J. Basler-Reeder, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 351 days.

(21) Appl. No.: 17/806,627

(22) Filed: Jun. 13, 2022

(65) Prior Publication Data

US 2023/0032044 A1 Feb. 2, 2023

Related U.S. Application Data

(60) Provisional application No. 63/203,218, filed on Jul. 13, 2021.

(51) Int. Cl.
*G06F 11/30* (2006.01)
*G01V 1/46* (2006.01)
(Continued)

(52) U.S. Cl.
CPC .................. *G01V 1/50* (2013.01); *G01V 1/46* (2013.01); *G01V 20/00* (2024.01); *G01V 2210/1234* (2013.01)

(58) Field of Classification Search
CPC ...................................................... G01V 1/50
See application file for complete search history.

(56) References Cited

U.S. PATENT DOCUMENTS

2017/0336529 A1* 11/2017 Denli ...................... G01V 20/00
2020/0183041 A1* 6/2020 Denli ...................... G01V 20/00
(Continued)

OTHER PUBLICATIONS

Fitchner, Andreas, and Andrew Zunino. "Halmiltonian nullspace shuttles." Geophysical research letters 46.2 (2019): 644-651. (Year: 2019).*

(Continued)

*Primary Examiner* — Phuong Huynh
(74) *Attorney, Agent, or Firm* — Lempia Summerfield Katz LLC

(57) ABSTRACT

A computer-implemented method for augmented inversion and uncertainty quantification for characterizing geophysical bodies is disclosed. The method includes machine-learning-augmented inversion that also facilitates the characterization of uncertainties in geophysical bodies. The method may further estimate wavelets without a well-log calibration, thereby enabling a pre-discovery exploration phase when well log data is unavailable. The machine learning component incorporates a priori knowledge about the subsurface and physics, such as distributions of expected rock types and rock properties, geological structures, and wavelets, through learning from examples. The methodology also allows for conditioning the characterization with the information extracted a priori about the geobodies, such as probabilities of rock types, using other analysis tools. Thus, the conditioning strategy may make the inversion more robust even when a priori distributions are not well balanced. Using the method, a scenario testing workflow may evaluate different candidate subsurface models, facilitating the management of uncertainty in decision-making processes.

24 Claims, 13 Drawing Sheets

(51) Int. Cl.
G01V 1/50 (2006.01)
G01V 20/00 (2024.01)

(56) References Cited

U.S. PATENT DOCUMENTS

2020/0183046 A1    6/2020    Wheelock et al.
2020/0183047 A1    6/2020    Denli et al.

OTHER PUBLICATIONS

A. Veillard, O. Morere, M. Grout and J. Gruffeille, "Fast 3D Seismic Interpretation with Unsupervised Deep Learning: Application to a Potash Network in the North Sea", EAGE, (2018).

Adelson, Edward H., et al. "Pyramid methods in image processing." RCA engineer 29.6 (1984): 33-41.

Bosch, M., Mukerji, T., & Gonzalez, E. F., "Seismic inversion for reservoir properties combining statistical rock physics and geostatistics: A review", Geophysics, 75(5), 75A165-75A176 (2010).

Cooke, D. A., & Schneider, W. A., "Generalized linear inversion of reflection seismic data", Geophysics, 48(6), 665-676 (1983).

Delprat-Jannaud F. and Lailly P., "A fundamental limitation for the reconstruction of impedance profiles from seismic data", Geophysics 70(1), R1-R14 (2005).

Fichtner, Andreas, and Andrea Zunino. "Hamiltonian nullspace shuttles." Geophysical research letters 46.2 (2019): 644-651.

Gunning, J., Kemper, M., Saussus, D., Pelham, A., & Fitzgerald, E., "A tour of optimisation methods for facies estimation in AVO seismic inversion using Markov random fields", In Proc., 75th EAGE Conference and Exhibition (Jan. 2013).

Helgesen, J., & Landrø, M., "Estimation of Elastic Parameters From AVO Effects In The Tau-P Domain1", Geophysical Prospecting, 41(3), 341-366 (1993).

I. J. Goodfellow, J. Pouget-Abadie, M. Mirza, B. Xu, D. Warde-Farley, S. Ozair, A. C. Courville, and Y. Bengio. Generative adversarial nets. In Proceedings of NIPS, pp. 2672-2680 (2014).

J. Brac, et al., "Inversion with a priori information: an approach to integrated stratigraphic interpretation, Reservoir Geophysics", ed. Sheriff, p. 251-258 (1992).

J. Mun, W. D. Jang, D. J. Sung and C. S. Kim, "Comparison of objective functions in CNN-based prostate magnetic resonance image segmentation," 2017 IEEE International Conference on Image Processing (ICIP), Beijing, 2017, pp. 3859-3863 (2017).

Jiang, Y., Wulff, B., "Detecting prospective structures in volumetric geo-seismic data using deep convolutional neural networks.", Poster presented on Nov. 15, 2016 at the annual foundation council meeting of the Bonn-Aachen International Center for Information Technology (b-it) (2016).

Jonathan Long, Evan Shelhamer, and Trevor Darrell, "Fully Convolutional Networks for Semantic Segmentation," CVPR (2015).

K.H. Zou, S.K. Warfield, A. Bharatha, C.M.C. Tempany, M.R. Kaus, S.J. Haker, W.M. Wells III, F.A. Jolesz, R. Kikinis "Statistical validation of image segmentation quality based on a spatial overlap index" Acad. Radiol., 11 (2), pp. 178-189 (2004).

Landrø, M., Buland, A., & d'Angelo, R., "Target-oriented AVO inversion of data from Valhall and Hod fields", The Leading Edge, 14(8), 855-861 (1995).

LeCun, Y., Bengio, Y., & Hinton, G., "Deep Learning.", Nature 521, 436-444, (2015).

Lörtzer, G. J. M., & Berkhout, A. J., "An integrated approach to lithologic inversion—Part I: Theory", Geophysics, 57(2), 233-244 (1992).

Marc G Bellemare, Ivo Danihelka, Will Dabney, Shakir Mohamed, Balaji Lakshminarayanan, Stephan Hoyer, and Rémi Munos, "The Cramer Distance as a Solution to biased Wasserstein Gradients", arXiv:1705.10743 (2017).

Martinez, et al., "Complex Reservoir Characterization by Multiparameter Constrained inversion, Reservoir Geophysics", ed. By Sheriff, 224-234 (1992).

Olaf Ronneberger, Philipp Fischer, Thomas Brox, "U-Net: Convolutional Networks for Biomedical Image Segmentation", Medical Image Computing and Computer-Assisted Intervention (MICCAI), Springer, LNCS, vol. 9351: 234-241 (2015).

Pan, G. S., Young, C. Y., & Castagna, J. P., "An integrated target-oriented prestack elastic waveform inversion: Sensitivity, calibration, and application", Geophysics, 59(9), 1392-1404 (1994).

Pratt R.G., "Seismic waveform inversion in the frequency domain, Part I", Geophysics 64, 888-901 (1999).

Rickett J., "The variable projection method for waveform inversion with an unknown source function, Geophysical Prospecting", 61, 874-881 (2013).

Rimstad, K., Avseth, P., & Omre, H., "Hierarchical Bayesian lithology/fluid prediction: A North Sea case study", Geophysics, 77(2), B69-B85 (2012).

Shipp R. and Singh S., "Two-dimensional full wavefield inversion of wide aperture marine seismic streamer data", Geophysical Journal International 151(2), 325-344 (2002).

Simmons Jr, J. L., & Backus, M. M., "Waveform-based AVO inversion and AVO prediction-error", Geophysics, 61(6), 1575-1588 (1996).

Simonyan, K., & Zisserman, A., "Very Deep Convolutional Networks for Large-Scale Image Recognition.", arXiv technical report (2014).

Wang K., Krebs J.R., Hinkley D. and Baumstein A., "Simultaneous full-waveform inversion for source wavelet and earth model. 79th Annual International Meeting", SEG, Expanded Abstracts 28, 2537-2541 (2009).

Zhang, C., Frogner, C., & Poggio, T., "Automated Geophysical Feature Detection with Deep Learning." GPU Technology Conference (2016).

* cited by examiner

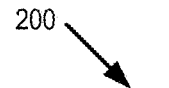
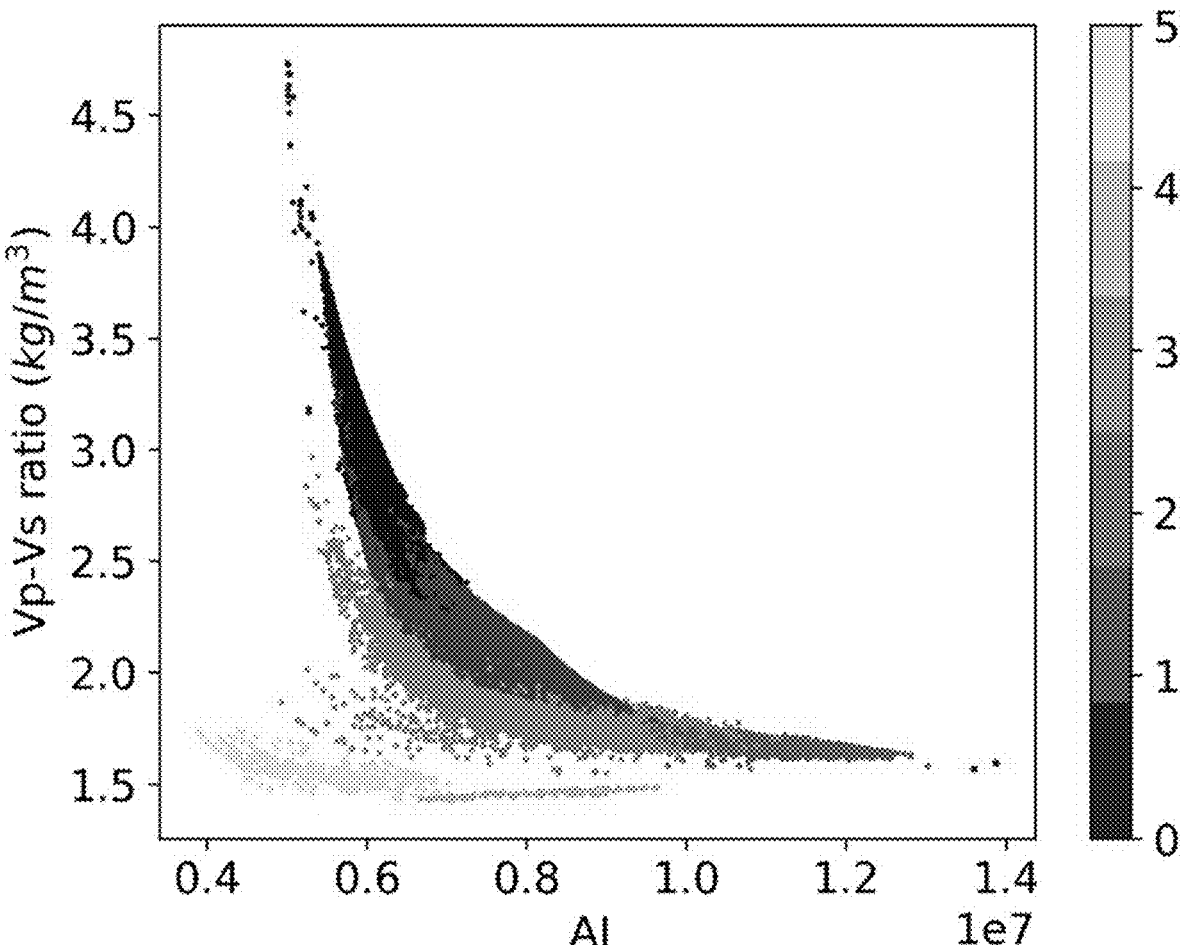
FIG. 2

$$\arg\max_\theta \mathbb{E}_{\mathbf{m}}\left[\log q_{\mathbf{m}}(\mathbf{m})\right] = \arg\max_\theta \mathbb{E}_{\mathbf{m}}\left[\log q_{\mathbf{z}}(f_\theta(\mathbf{m})) + \log\det\left(\left|\frac{\partial f_\theta(\mathbf{m})}{\partial\mathbf{m}}\right|\right)\right]$$

$$z = f_\theta(\mathbf{m})$$

Patch-based training and inversion
(with a stitching mechanism)

METHOD AND SYSTEM FOR AUGMENTED INVERSION AND UNCERTAINTY QUANTIFICATION FOR CHARACTERIZING GEOPHYSICAL BODIES

CROSS-REFERENCE TO RELATED APPLICATION

This application claims the benefit of U.S. Provisional Patent Application 63/203,218 filed Jul. 13, 2021 entitled METHOD AND SYSTEM FOR AUGMENTED INVERSION AND UNCERTAINTY QUANTIFICATION FOR CHARACTERIZING GEOPHYSICAL BODIES, the entirety of which is incorporated by reference herein.

FIELD OF THE INVENTION

The present application relates generally to the field of hydrocarbon exploration, development and production. Specifically, the disclosure relates to a methodology and framework for machine-learning-augmented inversion for facilitating the characterization of uncertainties in geophysical bodies.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Conventional approaches to generating petrophysical properties from seismic angle stacks involve a two-step or sequential or cascaded inversion process. As discussed herein, inversion may comprise any process whereby for an observation y known to depend on one or more quantities of interest x, the values of x corresponding to measured values of y are inferred. The first step of inversion may include elastic geophysical inversion whereby elastic or geophysical properties are inverted from seismic angle stacks. See, for example, D. Cooke and W. Schneider, "Generalized linear inversion of reflection seismic data", Geophysics 48, 665-676, (1983); and J. Helgesen and M Landro, "Estimation of elastic parameters from AVO effects in the Tau-P Domain", Geophysical Prospecting 41, 341-355, (1993); and J. Simmons and M. Backus, "Waveform-based AVO inversion and AVO prediction-error", Geophysics 61, 1575-1588, (1996). The second step of inversion may comprise petrophysical inversion whereby petrophysical properties are inverted from geophysical properties. See G. Lortzer and Berkhout, "An integrated approach to lithologic inversion-Part I: Theory", Geophysics 57, 233-244 (1992) (methods of relating elastic parameters obtained in elastic inversion to the lithologic parameters of interest); Pan, et al., "An integrated target-oriented prestack elastic waveform inversion", Geophysics 59, 1392-1404 (1994) (integrated elastic inversion followed by some form of lithology inversion or transformation); Martinez, et al., "Complex Reservoir Characterization by Multiparameter Constrained inversion", Reservoir Geophysics, ed. By Sheriff, 224-234, (1992); J. Brac, et al., "Inversion with a priori information: an approach to integrated stratigraphic interpretation", Reservoir Geophysics, ed. Sheriff, p 251-258, (1992); and M. Landro and A. Buland, "Target-oriented AVO inversion of data from Valhall and Hod fields," The Leading Edge, 855-861 (1995).

Other methods use seismic angle stacks to jointly invert for elastic or geophysical parameters and subsurface rock types or lithofacies. See, for example, Rimstad et al., "Hierarchical Bayesian lithology/fluid prediction: A North Sea case study", Geophysics 77, B69-B85, (2012); Gunning et al., "A tour of optimization methods for facies estimation in AVO seismic inversion using Markov Random Fields", 75th EAGE Conference & Exhibition incorporating SPE EURO-PEC 2013; see also Bosch, et al., "Seismic inversion for reservoir properties combining statistical rock physics and geostatistics: a review", Geophysics 75, A165-A176 (2010).

SUMMARY OF THE INVENTION

In one or some embodiments, a computer-implemented method of performing geophysical inversion is disclosed. The method includes: accessing measured data for a subsurface region; accessing prior subsurface data; solving an inversion problem using the measured data and the prior subsurface data tailored in at least one aspect to rock types, facies, or fluid types in order to generate an inversion solution tailored in the at least one aspect to the rock types, the facies or the fluid types; and using the inversion solution tailored in the at least one aspect to the rock types, the facies or the fluid types for hydrocarbon management.

In one or some embodiments, a computer-implemented method of machine learning-augmented geophysical inversion is disclosed. The method includes: accessing measured data for a subsurface region; accessing prior subsurface data; accessing conditioning data; forming an augmented forward model (based on a machine-learning model representing the prior subsurface data conditioned with the conditioning data, and a physics model mapping output of the machine-learning model to seismic data); initializing a plausible model by sampling latent space of a priori network model; solving, using the plausible model, an inverse problem described by the augmented forward model to find one or more solutions which are consistent with the seismic data, the prior subsurface data and the conditioning information; and using the one or more solutions for hydrocarbon management.

In one or some embodiments, a computer-implemented method of machine learning-augmented geophysical inversion is disclosed. The method includes: obtaining measured data for a subsurface region; obtaining prior subsurface data; forming an augmented forward model based on machine-learning with the prior subsurface data conditional on scenarios of at least one of geologic systems, rock types, facies, or fluid types; solving an inversion problem using the augmented forward model in order to generate one or more scenario solutions; testing at least one of the one or more scenario solutions; and using the at least one of the one or more scenario solutions for hydrocarbon management.

In one or some embodiments, a computer-implemented method of machine learning-augmented geophysical inversion is disclosed. The method includes: obtaining measured data for a subsurface region; obtaining prior subsurface data; forming an augmented forward model based on machine-learning with the prior subsurface data conditional on scenarios of at least one of geologic systems, rock types or facies; solving an augmented Hamiltonian null-space exploration problem to find multiple equally plausible solutions; and using the at least one of the multiple solutions for hydrocarbon management.

In one or some embodiments, a computer-implemented method simultaneously estimating wavelets and geophysical or petrophysical properties is disclosed. The method includes: obtaining measured data for a subsurface region; estimating initial wavelets; estimating, based on the measure data, initial geophysical or petrophysical properties; solving the inversion problem by simultaneously updating the initial wavelets and the initial geophysical or petrophysical properties; and using the solved inversion problem for hydrocarbon management.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIG. 2 is a graph that illustrates rock property and rock type distribution, including illustrating the Vp-Vs ratio vs. acoustic impedance (AI).

DETAILED DESCRIPTION OF THE INVENTION

Figure 1:
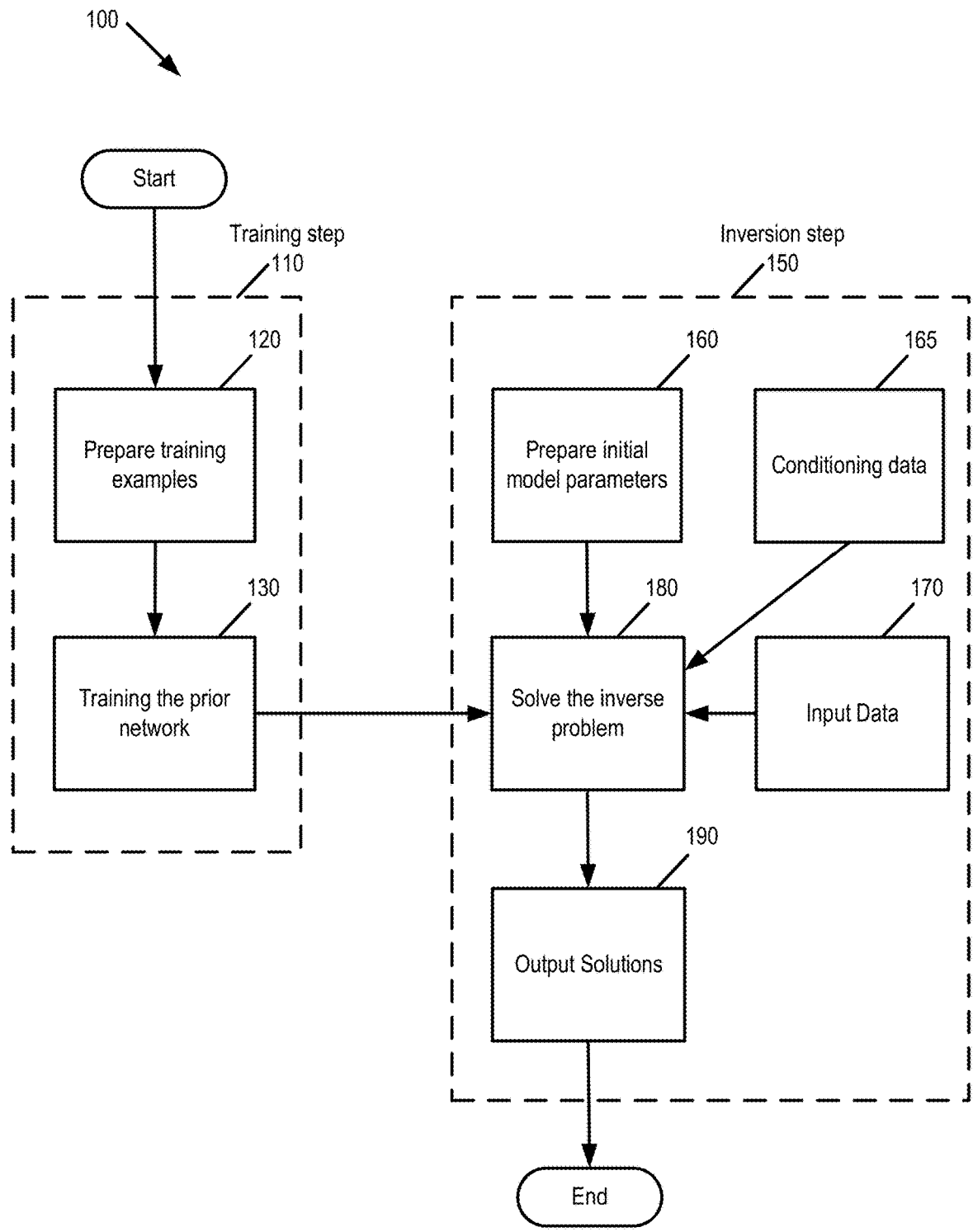
FIG. 1 illustrates an example workflow of a machine-learning-augmented inversion.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "hydrocarbon management" or "managing hydrocarbons" includes any one, any combination, or all of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or CO$_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, inversion typically involves a two-step inversion process. In particular, the geophysical inverse problem may be defined as using observed geophysical measurements (e.g., seismic recordings, electronic-magnetic signals, gravity measurements) to estimate the spatial distribution of the subsurface geophysical properties or rock properties. The subsurface geophysical properties or rock properties may include any one, any combination, or all of P and S wave propagation speed, density, electronic conductivity, magnetic permeability, rock porosity, rock permeability, vclay (e.g., the fractional volume of clay in the rock matrix), fluid saturation, net-to-gross ratio (e.g., the fractional reservoir volume occupied by hydrocarbon-bearing rocks), etc. However, inverse problems are typically ill-posed. First, the observed data may provide incomplete information due to limited aperture and limited bandwidth. By solving the inverse problem, the information from the observed data may need to be filled in order to obtain accurate and high-resolution results. Second, inverse problems may have non-unique solutions, meaning that one may need to appropriately assess the uncertainty in solutions for better decision making. As discussed in more detail below, the disclosed methodology addresses these two issues.

Further, the inversion methods described in the background typically rely on seismic data only to infer the quantity of interests, which is often desired to be resolved below the seismic scales. The seismic data alone may not be sufficient to resolve features in the reservoir scales because of its limited aperture and narrow bandwidth. Prescribing a priori distribution or a regularization term on the inversion parameters has been attempted to address this challenge. In particular, typical choices of such probability distributions have traditionally been Tikhonov regularization, total variation regularization, etc. However, it may be difficult using such analytical distributions to impose realistic geophysical and petrophysical relationships, which are consistent with the structural patterns (or lithology) of target geobodies, particularly in multi-parameter inversion.

In one or some embodiments, a machine-learned model, trained based on priors from a variety of sources, may be used to augment inversion in one, some, or all of the following: (1) initializing the inversion problem (e.g., using the machine-learned model, along with seismic data, as an initial solution for the inverse problem (such as initialize a plausible model by sampling in latent space)); (2) during the solving of the inversion problem (e.g., the machine-learned model may be used to determine data misfit with regard to the current inversion solution in determining whether to continue iterating in solving the inverse problem; in one embodiment, the machine-learned model captures conditional priors, which may takes in the current model solution for the inverse problem and the scenario probabilities and compute the value reflecting the probability of the current model solution; in this way, the machine-learned model may guide inversion to find plausible solutions (e.g., the machine-learned model knows what is more likely or less likely including the distributions of likelihoods of solutions); (3) for scenario testing (e.g., by conditioning on different scenario indication maps, the machine-learning augmented inversion generates multiple solutions; thereafter, a workflow of scenario testing may be used to analyze the multiple scenario model solutions, such as testing the plausibility of such multiple scenario model solutions and/or ranking one, some or all of the multiple scenarios based on analysis of the multiple scenario model solutions); and (4) for exploring the null-space of the solution, maybe within the neighborhood of a scenario or outside of any scenario (e.g., explore neighboring solutions with the Hamiltonian nullspace exploration).

The terms "conditional", "condition", "conditioned" are referred to as inferring a quantity of interest consistent with additional or new data (e.g., spatial distribution of sand over the subsurface or a target geobody). The conditioning data may differ from the a priori data because the machine learning model representing a priori information (e.g., network) is not trained with the conditioning data and the machine learning model may not have the bias toward the conditioning data. For instance, seismic data alone might be used to estimate the geophysical properties of subsurface. Those geophysical properties may be estimated in a way consistent with the additional data, such as distributions of sand obtained from an independent interpretation task. In this case, it is said the geophysical inversion is "conditioned" with the distribution of sand bodies. A conditional network parameterized by $\theta$: $f_\theta$ (e.g., conditional generative network) may use the conditioning data c to create samples m biased with c using $m=f_\theta(z; c)$, where z is the latent space representation, and $\theta$ is the network parameters trained a priori.

To address the first issue (potential incompleteness in the observed data), prior knowledge may be added into the inversion process. Various types of prior knowledge are contemplated, and may include understandings of geological phenomena, such as rock properties and/or how the rock properties are related to geological structures. The prior knowledge may be manifested in one of several ways, including statistical distributions (such as statistical distributions of rock properties that are defined above, rock types and facies). In one or some embodiments, rock types are categorical description of rocks in lithology, such as sand or shale. Facies may also be categorical description of rocks, but by some rock property or a collection of rock properties as well as rock types, such as "brine sands" and "oil sands" that combine rock types with pore fluids (rock properties). Other manifestations of the prior knowledge are contemplated. With this constraint to the inversion, the solutions may be narrowed to expected (or plausible) outcomes that not only fit the observed data, but also match realistic manifestations of the prior knowledge (e.g., match or comport with known distributions of facies, rock properties and their geometries). In pre-discovery settings, there may typically be little to no accurate estimation of wavelets from well logs. As a consequence, wavelets (and their distributions) may need to be estimated along with considering their respective uncertainties. For example, a distribution of wavelets may be used as a prior to infer wavelets during the inversion, as discussed in more detail below.

Merely by way of example, prior knowledge may be incorporated via a machine-learning training step. In particular, the methodology may include a training step in which the methodology may capture plausible geological models, such as rock types, facies or property distributions, by direct probabilistic modeling of examples in the machine learning component rather than relying on simple mathematical priors. Thus, the training step to generate the machine-learned model may be tailored in one or more respects such as tailored to specific examples (e.g., examples that represent rock physics priors) and/or to specific conditions (e.g., the machine-learning model or generator may capture conditional priors). For example, the machine-learned model may be conditional on any one, any combination, or all of, rock types, facies, or fluid types (e.g., hydrocarbon or water). So that, the machine-learned model, in generating the input to the inverse problem, may include one or more parameters tailored to rock types or facies, with those rock types or facies parameters being subject to solution in the inversion problem. More specifically, because the machine-learned model is conditional, multiple inputs associated with different conditions of rock types or facies may be generated for different inverse problem solutions, with those different inverse problem solutions later being evaluated to determine as to which of the different conditions of rock types or facies may be most likely. Thus, in one embodiment, the machine-learned model is configured to generate a single plausible rock distribution by direct probabilistic modeling of examples of examples in the machine learning component. Alternatively, the machine-learned model is configured to generate multiple plausible rock distributions for input to the inversion problem.

As another example, the machine-learned model may be dependent on different wavelet estimations. In turn, because the machine-learned model is conditional, multiple inputs associated with different wavelet distributions may be generated for different inverse problem solutions, with those different inverse problem solutions later being evaluated to determine as to which of the different wavelet distributions may be most likely.

In a first implementation, the methodology may use machine-learning-based augmentation in order to estimate any one, any combination, or all of rock properties, rock types or facies, or wavelets from seismic data. Alternatively, or in addition, the priors and inversion may be conditional on scenarios of rock types or facies obtained from other independent seismic processing tools upstream to the inversion, not simply from the priors based on knowledge bases.

In this way, the methodology is configured to learn from examples, thereby fully leveraging the knowledge of domain experts and advanced geological simulation tools. Various examples to train the model are contemplated. In particular, the examples may be constructed from: (i) geostatistical simulation based on distribution of rock types or facies, and rock property distributions based on such rock types or facies; (ii) synthetics (e.g., physical stratigraphy simulations) or analogs (e.g., well data, prior petrophysical inversion or full-waveform inversion results); or (iii) augmentation of subsurface examples consistent with depositional history of the target basin or subsurface. In this way, the examples (which may include sub-seismic features) from which the machine-learning model learns may be derived from a variety of sources including any one, any combination, or all of: domain experts; simulations; or analogs that represent rock physics priors linked to the shapes of geophysical anomalies.

Further, the machine-learning-based representation of geology and fluids may be implemented in a variety of ways including (i) autoencoders, generative adversarial networks (GANs), normalizing flows, or recurrent neural networks (e.g., Deep Recurrent Attentive Writers) that may represent the sedimentary nature of geological basins; and/or (ii) patch-based representations whereby the patches may be stitched to represent the full subsurface domain Patch-based representations may be implemented in a variety of ways including stitching may be performed through multiscale Laplacian blending, dilated latent space, or multiscale encoders and decoders, so that the model is consistent with data, while also has few artifacts and maintains spatial continuity. Further, the patch-by-patch representation may provide computational efficiency, is amenable to parallel processing, and may allow the decomposition of geological priors into smaller regions so that the training examples can be based on simpler geometries compared to the full model. In this regard, the patch-based representation may be easier to generate simpler subsurface geometries synthetically.

Alternatively, or in addition, scenario-based inversion may be performed, which may address the second issue of non-uniqueness of solutions. Inversion may begin or be initiated based on an initial solution (which may be modified iteratively). In one or some embodiments, inversion may comprise beginning with a plurality of distinct and separate initial solutions (which may correlate to different potential scenarios), with subsequent iterations being performed on one, some, or each of the separate initial solutions to generate a plurality of iterative solutions (with the plurality of iterative solutions correlated to the different potential scenarios). In one or some embodiments, the plurality of distinct and separate initial solutions may be generated by the machine-learned model, which may be conditional as discussed above. Alternatively, or in addition, the plurality of distinct and separate initial solutions may be generated based on other types of prior knowledge. The plurality of iterative solutions, generated by solving the inverse problem based on the plurality of distinct and separate initial solutions, may be evaluated in one of several ways. In one way, the machine-learned model (which may be used to generate one, some, or all of the initial solutions) may be used to evaluate the likelihood of the plurality of iterative solutions. In this role, the machine-learned model may act as a critic of the plurality of iterative solutions (rather than a generate of the initial solutions). Alternatively, or in addition, a loss function (e.g., cross validation) may be used to evaluate the plurality of iterative solutions. For example, a portion of the seismic data (not use for inversion) may be used to evaluate the plurality of solutions for a particular metric (e.g., average data loss). In this way, the plurality of iterative solutions may be evaluated based on a prediction of and a comparison to the portion of the seismic data not used for solving the inverse problem. Further, based on the analysis of the plurality of iterative solutions, the multiple scenarios (correlated to different ones of the iterative solutions) may be evaluated, such as ranked (e.g., based on most likely to least likely scenarios). Alternatively, iteration may be stopped once the number of iterations exceeds a maximum number of iterations.

Thus, scenario-based inversion may be performed in several respects, including conditioning of inversion based on scenarios and/or scenario-based testing. As one example, scenario-based inversion may comprise conditioning of inversion based on different scenarios, such as different scenarios of rock types and/or facies. The different scenarios (e.g., hydrocarbon filled reservoir versus brine filled reservoir or sand facies versus clay facies or a combination of the two) may be obtained from a variety of sources, such as one or both of prior knowledge (e.g., based on knowledge bases) or other independent seismic processing tools upstream to the inversion. The various outcomes may be incorporated into the inversion process so that the results would be informed by and be consistent with other independent processes. This may particularly assist with the inversion process adapting to situations in which the prior distributions (e.g., gathered from the knowledge bases and/or expectations) may not fully represent the target distributions of quantity of interests, and may also enable leveraging of other seismic interpretation tools (e.g., labels from domain experts and/or advanced geophysical anomaly detection/classification tools).

As another example, scenario-based testing may be performed, which may address the second issue discussed above (inverse problems may have non-unique solutions) and in which the uncertainty is managed through a so-called scenario testing procedure. As discussed in more detail below, the scenarios may be tested or evaluated in one of several ways including any one, any combination, or all of: (1) analyzing for data misfit (e.g., based on a portion of the seismic data not used in generate the scenario solutions); (2) analyzing the distribution of the scenario solutions; or (3) analyzing the bounds (e.g., the optimization problem may be solved within the bounds of an anomaly; the analysis may check whether the bounds assumed the correct range of the assumed anomaly).

Scenarios may be defined in one of several ways. In one way, a scenario may be defined as a mode of anomalies in possible solutions. For example, one scenario of a possible geophysical anomaly may be sand while the other scenario of a possible geophysical anomaly may be shale. Based on the conditioning functionality in the augmented inversion (discussed above), the disclosed workflow may assist in evaluating the relative likelihood of each scenario in decision making.

In this way, the disclosed methodology has several advantages over traditional methods. First, the methodology may capture plausible geological priors (e.g., rock distributions) by direct probabilistic modeling rather than simply relying upon simple mathematical priors designed for the sake of the mathematical completeness of the problem (e.g., smoothness of the solution) or simple analytical assumptions of distributions. Second, the methodology may interlink various concepts that are currently disconnected in the typical inversion process (e.g., interlinking the rock physics relationship with 2-D or 3-D geological structures). In other words, the geometric shapes of geobodies may be associated with their geophysical or petrophysical properties, which may not be able to be captured by conventional regularization methods. For instance, the relationship between the shapes of channels systems and their petrophysical properties (e.g., sand and clay fractions, porosity, permeability, etc.) may be different than that between the shapes of the lobe systems and their properties. Third, the methodology may incorporate priors about sub-seismic features, which may increase inversion resolution and may also help resolve uncertainties in scenario testing. Fourth, the methodology may estimate a variety of posterior distributions of parameters, including rock properties, rock-types, and wavelets (e.g., the methodology may simultaneously estimate wavelets along with the geophysical or petrophysical properties, allowing the applications to pre-discovery settings). Fifth, the methodology may enable scenario testing with machine-learning-based priors conditional on scenarios of geologic systems, rock types or facies, or wavelets, which enables the management of uncertainties and includes the inferences from domain of expert or other independent processes. Thus, the methodology may enable quantitative scenario testing with machine-learning-based priors conditional on scenarios of geologic systems, rock types or facies, which, in turn, enables the management of uncertainties and includes the inferences from domain experts or other independent processes.

In this way, the inversion step may be tailored, such as tailored in at least one aspect to rock types or facies in order to generate an inversion solution tailored to the at least one aspect to the rock types or facies. The tailoring of the inversion may be performed in one of several respects including any one, any combination, or all of: machine-learning augmentation applied to rock types or facies (e.g., forming an augmented forward model based on machine-learning with the rock types scenarios or the facies scenarios, and solving the inversion problem using machine-learned augmented forward model for the rock types or the facies scenarios); conditioning inversion based on scenarios of the rock types or the facies (e.g., the conditioning of the inversion is based on the scenarios of the rock types or the facies obtained from seismic processing tools independent from priors based on knowledge bases and upstream to the inversion); or machine-learned model used to determine how to perform at least one aspect of the inversion, such as whether to continue iteratively solving (e.g., the augmented forward model based on machine-learning with the rock types scenarios or the facies scenarios may be used to determine whether to continue iteratively solving by comparing a solution generated by the augmented forward model with a solution generated by the iterative solving and determining whether to continue iterating based on the comparison).

Further, the inversion step may be able to simultaneously estimate wavelets along with the geophysical or petrophysical properties, allowing the applications to pre-discovery settings. The initial wavelets may be estimated in a variety of ways, such as by using statistical wavelet estimations, obtained from elastic FWI results, or transferred from overlapping/nearby seismic surveys with well ties. The a priori distribution of wavelets may be about their corner frequencies or in the form of examples. Further, the wavelet amplitudes may be updated during inversion. Also, the methodology may invert for the corner frequencies of the wavelets if their analytic form is assumed. The methodology may further train a neural network on wavelet examples to find efficient representations in the latent space, and invert for wavelets by updating in the latent space of the wavelet network.

The methodology, discussed in detail below, may be used in a variety of geophysical inversion use cases, such as velocity model building, wave-equation-based velocity analysis, travel-time tomography, full-wavefield inversion (FWI), least-squares migration, electromagnetic (EM) inversion, and amplitude-versus-offset (AVO) inversion, petrophysical inversion, etc. For simplicity, the discussion below focuses on AVO inversion merely for purposes of illustration.

Referring to the figures, FIG. 1 illustrates an example workflow 100 of a machine-learning-augmented inversion, which comprises (or consists of) two major steps: a training step 110 and an inversion step 150. In this regard, FIG. 1 is an expansion of machine-learning-augmented inversion illustrated in US Patent Application Publication No. 2020/0183041 A1, incorporated by reference herein in its entirety. The training step 110 is configured to use training examples of subsurface properties and wavelets as input, and to construct neural networks that incorporate the a priori knowledge from the training examples. The neural networks may serve as an input for the inversion step 150. The inversion step 150 is configured to combine data information (input data 170) and the a priori information from the neural network generated by the training step 110 to reconstruct estimated subsurface properties by solving an optimization problem.

With regard to the training step, training examples are prepared 120. Various training examples are contemplated.

By way of example, a priori knowledge may comprise (or consists of) the rock property distribution and the distribution of wavelets. The rock property distributions may include: (1) rock type distributions (e.g., sand or shale) from the rock type probability estimations (e.g., machine learning rock type models) or the knowledge bases (e.g., retrieval of rock type distributions based on environment of deposition and depth); and/or (2) geophysical property distributions that are either priors from synthetics (e.g., process stratigraphy) or analogs (e.g., well data, prior petrophysical inversion or full-waveform inversion results). These distributions are typically complex, and difficult to be captured by empirical or analytical forms (e.g., Gaussian mixture models). An example of the rock property and rock type distribution is illustrated in the graph 200 in FIG. 2. This type of priors may be provided by examples. The examples may be generated using geological modeling tools (e.g., reservoir modeling) that distributes those rock types based on a set of geometrical templates or functional forms describing a depositional system.

Well log information may significantly assist in making inversion results less ambiguous, both in informing rock property distributions and in estimating the seismic wavelet. Generally, rock property distributions may be interpreted and/or constructed from nearby "analogue" wells. Similarly, it is possible to construct an "analogue" wavelet through application of nearby wells on proximal or even overlapping seismic datasets. The seismic wavelet may comprise the transfer function from elastic properties to synthetic seismic data. True source wavelet estimations without well data may be difficult due to direct relationship of the Earth's reflectivity model to the seismic signal. See, for example, Delprat-Jannaud and Lailly, 2005. If one assumes the Earth's reflectivity spectra is white and phase is constant, one may generally construct a wavelet which is a good approximation of the true wavelet in frequency and phase. See, for example, Pratt, 1999). However, the wavelet may not have the correct scaling. See, for example, Shipp- and Singh, 2002. Other more advanced techniques may also be considered, such as variable projection (see, for example, Rickett, 2013) and joint inversion (see, for example, Wang et al., 2009). Where well data is unavailable, a wavelet may need to be produced by one of these or other methods. The results of inversion with such a wavelet may be inspected to determine if the results are reasonable. Further, an ensemble of wavelets may be constructed and fed into a scenario-based approach.

Figure 3:
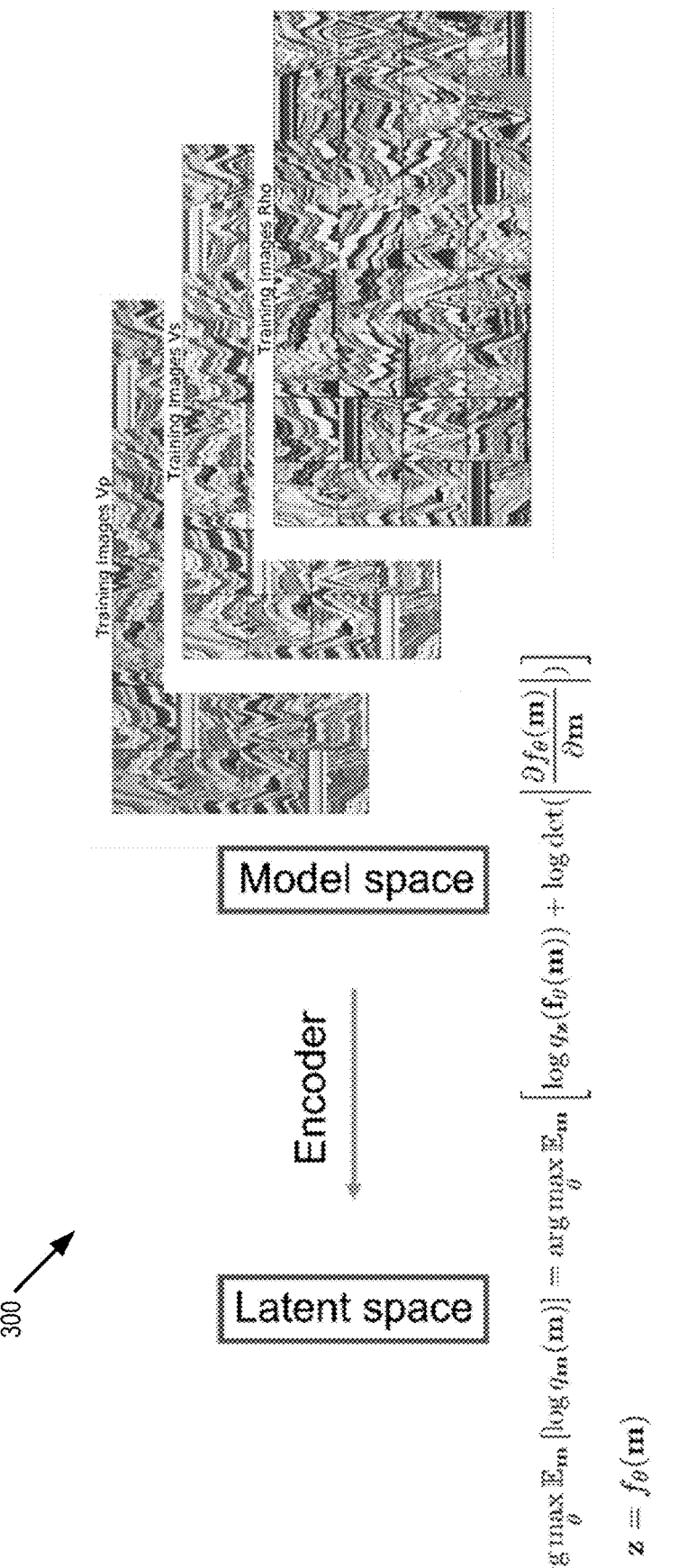
FIG. 3 illustrates one methodology for training the generator with examples that are constructed using prior knowledge of rock distributions.

At 130, the a priori neural networks are trained. Specifically, to make the priors tractable for inversion, the information may be consolidated by training a generator (e.g., a priori neural network that may be configured as a machine-learned augmented forward model) with these examples (see block diagram 300 in FIG. 3). As discussed above, the machine-learned neural network may be used in one or more contexts. In one context, the machine-learned neural network may act as a generator, such as to generate an initial solution as input for solving the inverse problem at 180. Alternatively, or in addition, the machine-learned neural network may act in other capacities, such as for evaluating or assisting in solving the iterative problem and/or in evaluating a plurality of potential solutions (e.g., in scenario testing, discussed below). As discussed above, various architectures for the machine learning model are contemplated including: encoder network; decoder network; autoencoder network; variational autoencoder network; generative network; classifier network; discriminator network; generative-adversarial network; recurrent networks; DRAW; or normalizing flow networks.

Figure 4:
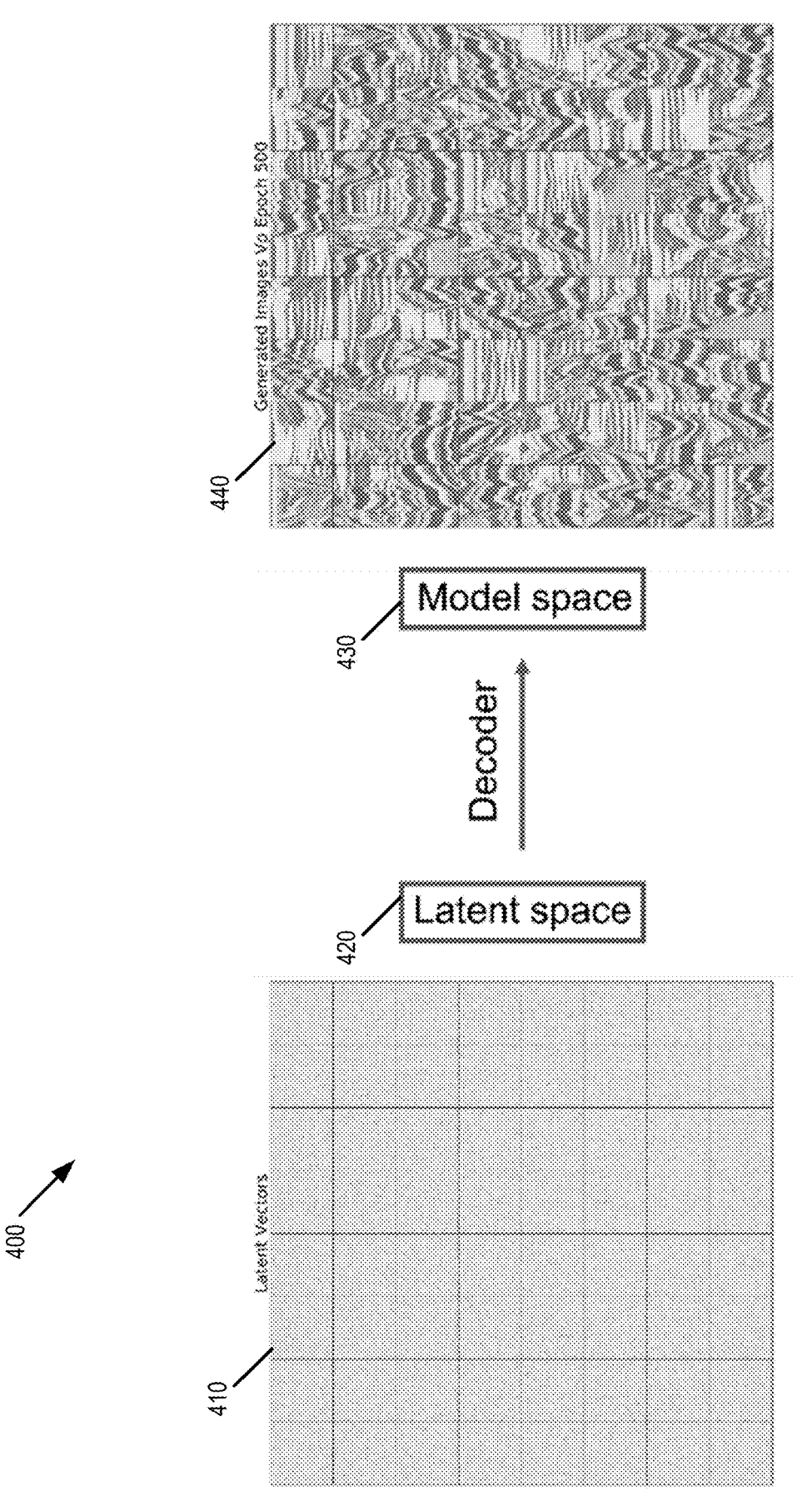
FIG. 4 is one representation of the generator or decoder maps from random vectors sampled in the latent space to the rock properties in the model space.

After training, the generator may be able to create examples that match the prior distribution provided by the samples by sampling in the latent space and mapping to the model space (see FIG. 4). In particular, FIG. 4 is an illustration 400 of the mapping (using a decoder) of latent vectors 410 in latent space 420 to generated images 440 in model space 430.

On the other hand, the neural network may be able to take a subsurface model as input and outputs a likelihood value of that model as an evaluation of probability. As discussed below, this ability to use the neural network to evaluate the probability of the subsurface model may be used in the inversion step 150, such as a regularization method in the inversion step 150 and/or as a determination of whether to continue iteration of the inversion step 150.

In real-world applications, especially pre-discovery, it may be difficult to obtain accurate distribution information that represents the correct geometric distribution across different rock types. Having incorrect proportion of rock types may lead to erroneous results. For example, if the prior distribution leans heavily towards shale, the training examples may contain little sand bodies, and finally the inversion results would cluster on the shale trend. To alleviate this problem and also for the scenario testing purpose (discussed below), in one or some embodiments, the generator may be made conditional. More specifically, a map of categorical labels or the probabilities of scenarios may be created for each pixel or element in the model. The generator may then create examples that match such labels. In inversion, human interpreters or geophysical anomaly classification algorithms can make and refine the labels or scenario probabilities according to the inverted model of the last iteration. In this way, the inversion may be more stable and less susceptible to inaccurate weights on distribution of different scenarios or modes. Further, for the inversion of wavelets, the neural network may be trained using wavelet examples to find efficient representations in the latent space.

With regard to the inversion step 150, at 160, initial model parameters are prepared. Specifically, in inversion, the models may include any one, any combination, or all of subsurface properties, wavelets, and rock-type indicator or probability cubes. In one or some embodiments, the model may be initiated properly to ensure convergence in solving the inverse problem (at 180). For example, the subsurface properties may be initialized from any one, any combination, or all of full-wavefield inversion, manual interpretation, band-limited inversion, or velocity analysis results. The initial wavelets may be estimated by the methods outlined above, such as statistical wavelet estimations, joint inversion during full waveform inversion, or transferred from overlapping/nearby seismic surveys with well ties. The label or probability cube of rock types may be initialized by the output of applying a geophysical anomaly detection algorithm to the observed data, for example.

In one or some embodiments, conditioning data 165 may be available. As such, the conditioning data may likewise be input to solve the inverse problem at 180. As discussed above, various types of conditioning data are contemplated. In one or some embodiments, conditioning data may comprise a collection of data or dataset to constraint, infer or determine one or more reservoir or stratigraphic models. Conditioning data may include any one, any combination, or all of geophysical models, petrophysical models, seismic images (e.g., fully-stacked, partially-stacked or pre-stack migration images), well log data, production data and reservoir structural framework. Examples of conditioning data are included in US Patent Application Publication No. 2020/0183047 A1, incorporated by reference herein in its entirety.

Thus, 180 may receive a plurality of inputs, such as any one, any combination, or all of: the machine-learned augmented input from the training step 110; the input data 170; the initial model parameters 160, or the conditioning data 165. In particular, in one embodiment, 180 receives as input the machine-learned augmented input from the training step 110 and the input data 170 (and optionally the conditioning data if available but not the initial model parameters 160).

At 180, the inverse problem is solved with various inputs. In particular, with the initialized models (see 160), the a priori neural networks constructed in the training step 110, and input data 170 (which may comprises observed data), inversion may be performed for subsurface properties and/or wavelets. As discussed above, the inversion problem may be solved in a variety of ways, such as by solving an optimization problem using gradient-based methods (e.g., quasi-Newton methods).

To make the optimization process stable, latent vectors (e.g., representation of a priori information) may be kept to follow a normal distribution, such as a standard normal distribution (e.g., a Gaussian or a Laplace-Gauss distribution), during the inversion. It is an assumption that the entries of latent space vectors are independent and identically distributed standard normal random variables. After training, the network may map from standard normal random vectors to high-resolution plausible subsurface models. Therefore, retaining this property of the latent vectors ensures that the inversion process traverses within the subspace of high-resolution realistic models. For this purpose, latent vectors are re-parameterized with the following layers or mathematical operations: (1) a data-dependent layer of rotation matrix that approximately rotate a random vector to statistically-independent axes; and/or (2) data-dependent layers of nonlinear activation functions that approximately scales the values of the random vector to appear normal distributed. With these layers, an arbitrary random vector may be mapped to another that has entries distributed approximately as the standard normal distribution.

At a certain number of iterations (e.g., a specified number of iterations) of the optimization process, labels or scenario probabilities may be created with human interpretation of the current model or by applying detection/classification algorithm to it. The a priori network may input the model and the scenario probabilities and may compute the value reflecting the probability of the current model. This value of model evaluation may be added to data misfit as the total objective function value (e.g., a soft constraint to the data misfit), and may be used to compute the gradient with respect to model parameters. This is merely one way of using the generator. Specifically, inversion may also be performed in the latent space as well (e.g., using the latent variables as parameters for inversion where the quantity of interests are projected to the latent space using the a priori network).

This conditioning strategy may make the inversion more robust even when a priori distributions are not balanced (e.g., one rock type is dominant in the training data, not reflecting the true distribution in the seismic). In addition to (or instead of) using priors about rock types or facies to stabilize the inversion, the conditional prior may be used to directly estimate the volumetric distribution of rock types or facies.

In pre-discovery settings, there may be no well-log information to calibrate wavelets, thereby necessitating incorporation of wavelet inversion/estimation into the workflow. In one or some embodiments, the wavelet amplitudes may be updated during inversion. Also, the corner frequencies of the wavelets may be inverted if one assumes their analytic form. The methodology may further train a neural network on wavelet examples to find efficient representations in the latent space, and invert for wavelets by updating in the latent space of the wavelet network.

Figure 5:
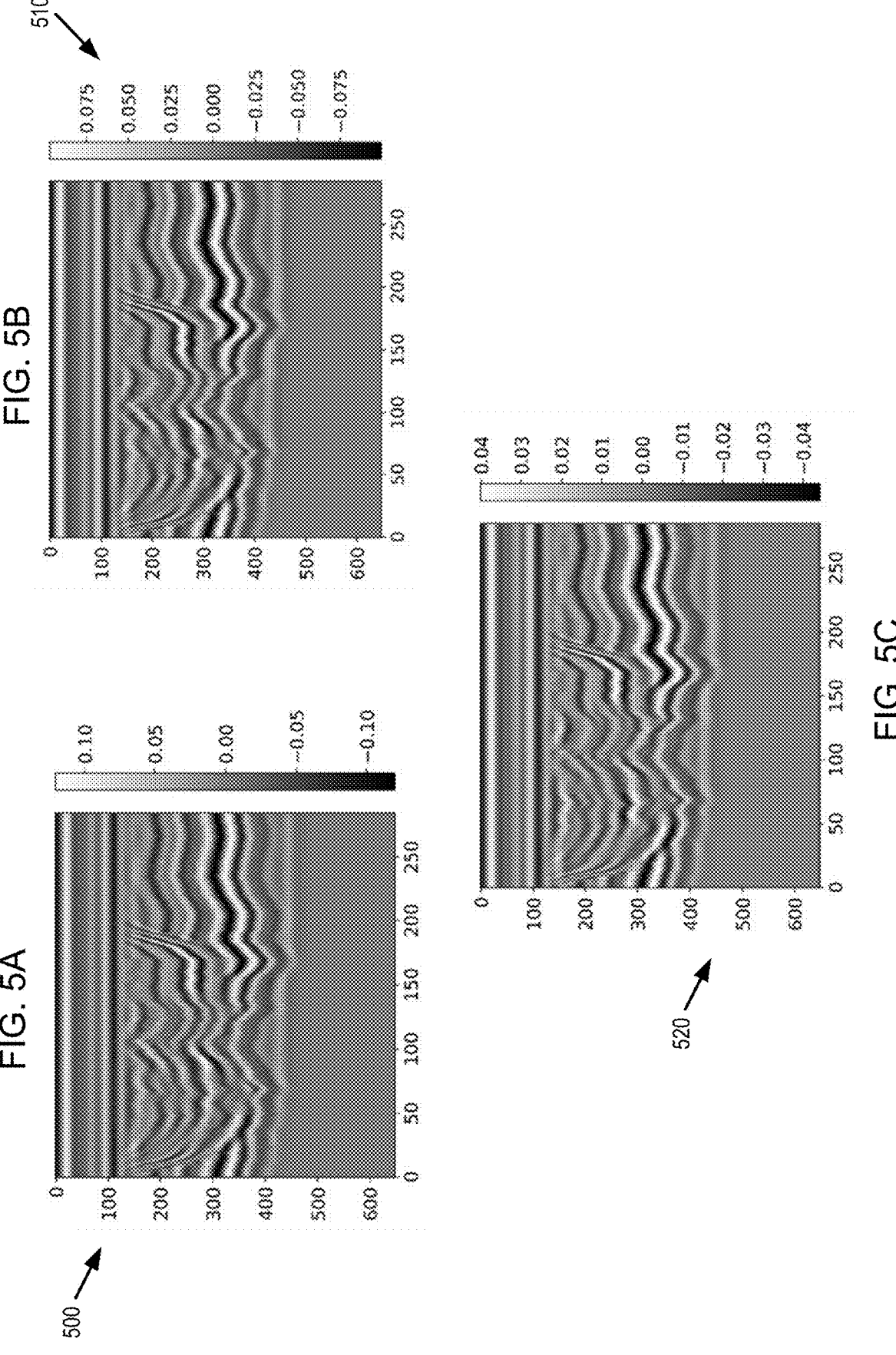
FIGS. 5A-C illustrates the seismic response at different incident angles, including at 5° (FIG. 5A), 15° (FIG. 5B), and 30° (FIG. 5C).

As discussed above, various implementations of the methodology are contemplated. Below are numerical examples for purposes of illustration. Other examples are contemplated. In particular, the methodology and workflow may be applied to a variety of geophysical inverse problems. One such inverse problem is AVO inversion, an example of which is discussed below merely for illustration. The data for AVO inversion may typically be partial or pre-stack (of pre-critical reflections) seismic images or their representations. FIGS. 5A-C illustrate examples of synthetic seismic data corresponding to different reflection angles, including at 5° (500 in FIG. 5A), 15° (510 in FIG. 5B), and 30° (520 in FIG. 5C). The methodology may address various kinds of AVO models. For simplicity, the physics model for AVO inversion is 1D convolution and a simplified Zoeppritz equation; though, other more complicated AVO inversions are contemplated. This type of equation may be accurate only within small incident angles (e.g., up to around 30 degrees), and only involves P-wave (or only S-wave) for easier analysis. To use this model, it may be assumed that the effects of 3-D wave propagation are addressed using pre-stack migration, and that the effects of moveouts and attenuation, etc., may also be corrected. In the following example, Shuey's simplification of the Zoeppritz equation is used; however, the inversion workflow may be applied to AVO equations with the extension of anisotropy (e.g., Ruger models) and attenuation. It is expected in those more complex physics models that the augmentation from machine learning may play a more prominent role in estimating additional parameters.

Various forms of the AVO equations are contemplated. For example, the AVO equation in the presented example may comprise:

$$R(\theta,t,x)=A(t,x)+B(t,x)\sin^2(\theta)+C(t,x)(\tan^2\theta-\sin^2(\theta)), \quad (1)$$

where $\theta$ denotes the incident angle, t the time axis, x is the common depth point (CDP) axis, and $R(\theta, t, x)$ is the incident-angle-dependent reflectivity. The parameters A, B, C are space-time dependent coefficients related to rock properties. Specifically, $$A(t, x) = \frac{1}{2}\left(\frac{\Delta\alpha}{\bar{\alpha}} + \frac{\Delta\rho}{\bar{\rho}}\right) \quad (2)$$

$$B(t, x) = \frac{1}{2}\frac{\Delta\alpha}{\bar{\alpha}} - 4\frac{\bar{\beta}^2}{\bar{\alpha}^2}\frac{\Delta\beta}{\bar{\beta}} - \frac{2\bar{\beta}^2}{\bar{\alpha}^2}\frac{\Delta\rho}{\bar{\rho}}$$

$$C(t, x) = \frac{1}{2}\frac{\Delta\alpha}{\bar{\alpha}},$$

where $\bar{\alpha}$, $\bar{\beta}$, and $\bar{\rho}$ are the average P-wave velocity, S-wave velocity, and density of the layer above and the layer below, while $\Delta\alpha$, $\Delta\beta$, and $\Delta\rho$ are the differences of P-wave velocity, S-wave velocity, and density between the layer below and the layer above. In field data applications, it may be beneficial to switch to a more robust parameterization, such as acoustic impedance and Vp-Vs ratio. With the incident-angle-dependent reflectivity R(θ, t, x) defined above, one may model the corresponding seismic response using the following:

$$S(\theta,t,x)=f(t)*R(\theta,t,x), \quad (3)$$

which is a 1D convolution of every trace with wavelet f(t) in time. The inverse problem reconstructs the map of P-wave velocity α, S-wave velocity β, and density ρ, as well as the source wavelet function.

This problem may be viewed as a deconvolution problem. The wavelet is usually band-limited. Further, the low-frequency components are typically missing or contaminated by strong noise, and higher frequencies are typically attenuated by the earth/overburden at typical seismic depths. As a result, the seismic response may be regarded as a band-pass filtered version of reflectivity. Without prior knowledge, it may be difficult to reconstruct the missing frequency component with conventional inversion.

Figures 7A, 7B, 7C:
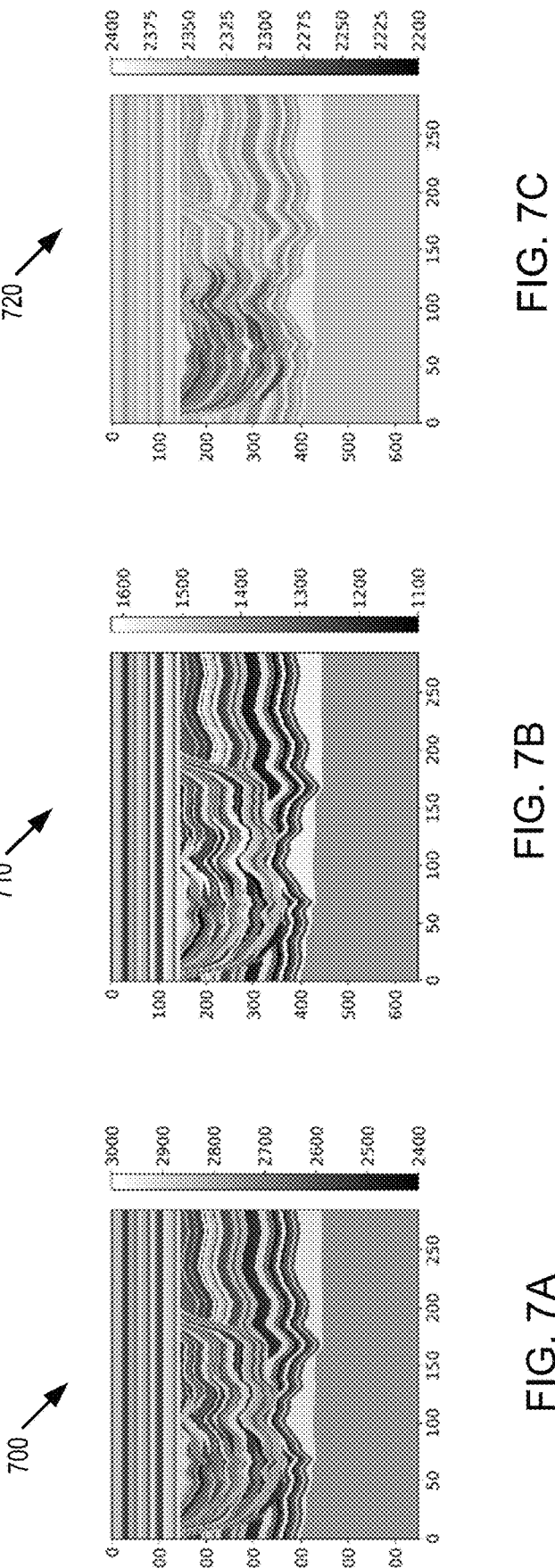
FIGS. 7A-L illustrate numerical results related to the augmented inversion including FIGS. 7A-C illustrating true models of Vp (FIG. 7A), Vs (FIG. 7B), and density (FIG. 7C), FIGS. 7D-F illustrating initial models of Vp (FIG. 7D), Vs (FIG. 7E), and density (FIG. 7F), FIGS. 7G-I illustrating inversion results without regularization of Vp (FIG. 7G), Vs (FIG. 7H), and density (FIG. 7I), and FIGS. 7J-L illustrating inversion results with the disclosed augmented-inversion workflow of Vp (FIG. 7J), Vs (FIG. 7K), and density (FIG. 7L), showing higher resolution and corrected values compared to those without regularization as shown in FIGS. 7G-I.
Figures 7D, 7E, 7F:
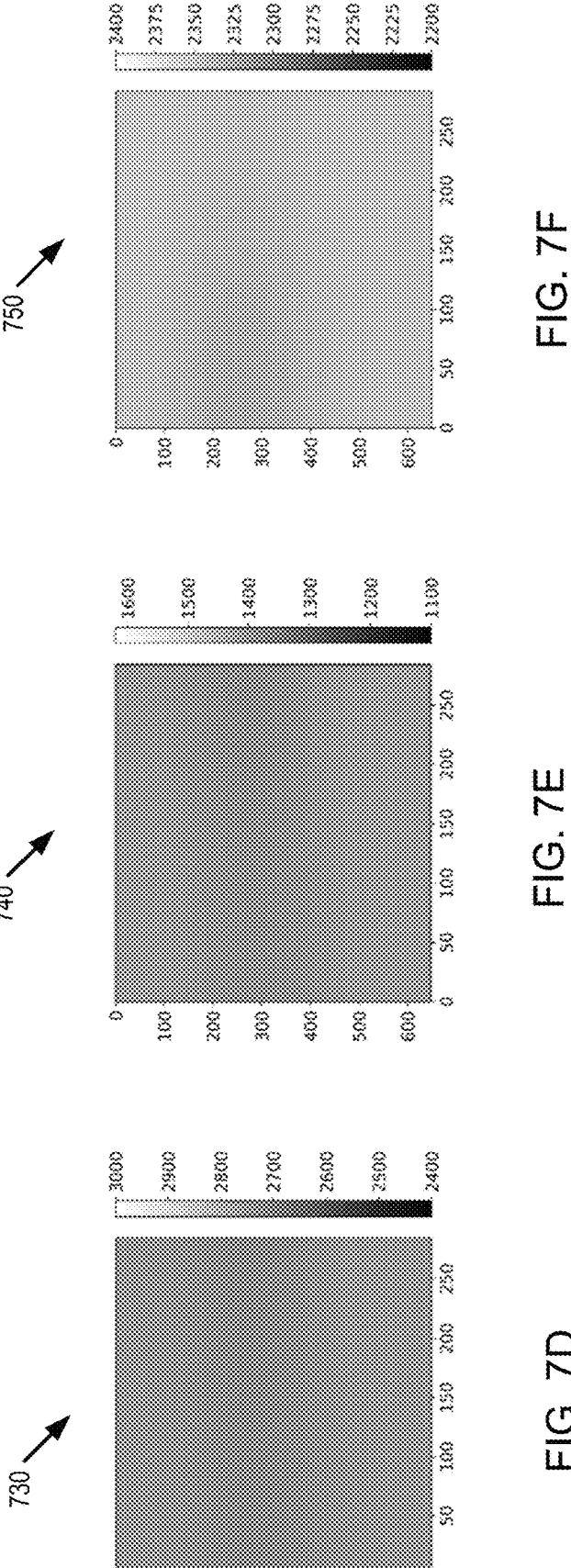
Figures 7G, 7H, 7I:
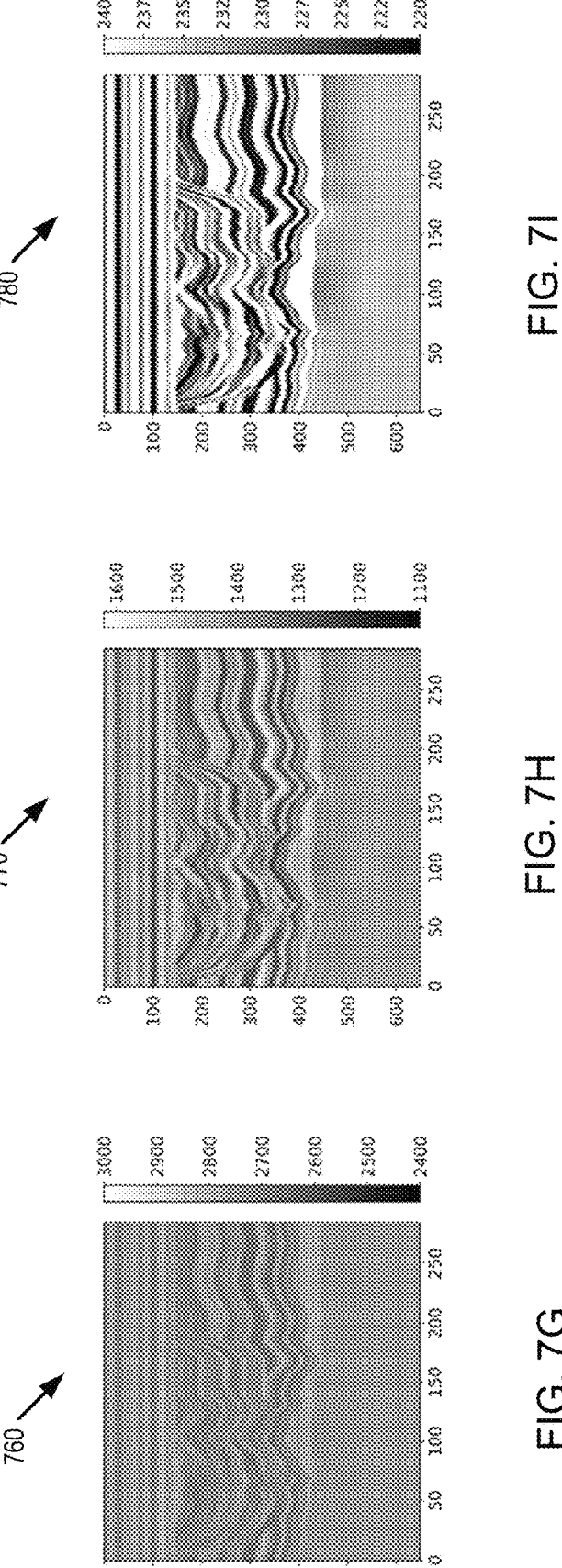

This may be illustrated using a synthetic example. For example, FIGS. 7A-L illustrate numerical results related to the augmented inversion, including illustrations of the true model (FIG. 7A is an illustration 700 of the true model of Vp; FIG. 7B is an illustration 710 of the true model of Vs; and FIG. 7C is an illustration 720 of the true model of density) and a corresponding smoothed model as the initial model (FIG. 7D is an illustration 730 of the initial model of Vp; FIG. 7E is an illustration 740 of the initial model of Vs; and FIG. 7F is an illustration 750 of the initial model of density). The wavelet used comprises a Ricker wavelet with a dominant frequency of 10 Hz. The frequency components below 5 Hz were attenuated. FIGS. 7G-I illustrate traditional inversion results without regularization of Vp (760 in FIG. 7G), Vs (770 in FIG. 7H), and density (780 in FIG. 7I). As shown, there are ringing artifacts in the inverted model due to the missing frequencies. Also, the petrophysical relationship in this model may not be correct. For example, the $V_p/V_s$ ratio is far from the ground-truth. See FIGS. 7G-H.

Figures 7J, 7K, 7L:
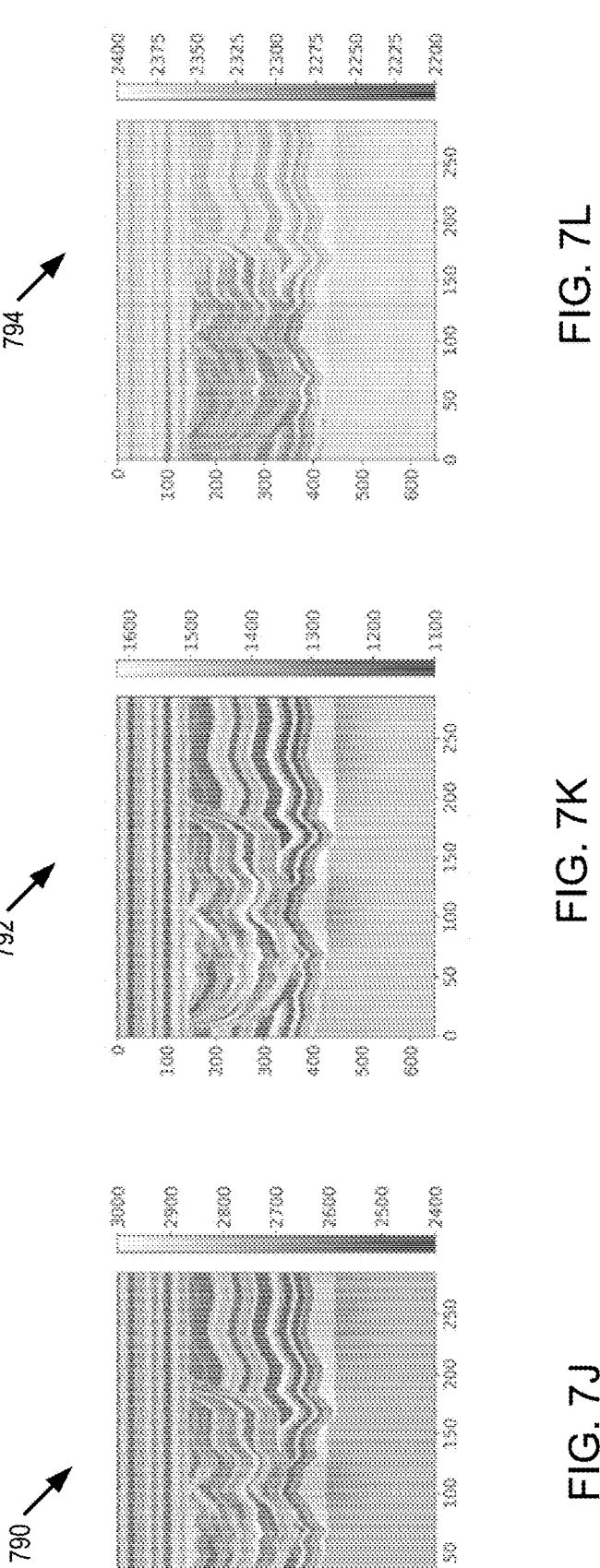

In contrast, the deep-learning portion of the disclosed methodology is implemented and compared with the inversion result with that of the conventional method. See FIGS. 7G-I versus FIGS. 7J-L. In particular, the inversion results with the disclosed augmented-inversion methodology and patch-stitching mechanism (discussed below) include Vp (790 in FIG. 7J), Vs (792 in FIG. 7K), and density (794 in FIG. 7L). As shown, the inversion results with the disclosed augmented inversion methodology show higher resolution and corrected values compared to those without regularization. These results depicted in FIGS. 7J-L illustrate that the ringing artifacts are reduced, and that sharp edges are reconstructed, meaning that the decoder may be able to fill in the frequency spectrum and widen the bandwidth. On the other hand, compared to the conventional method result (see FIGS. 7G-I), the augmented inversion may automatically enforce realistic petrophysical relationship that comports with the corresponding geological structures, and the values and ratios of multiple parameters are reasonable and interpretable.

Figure 8:
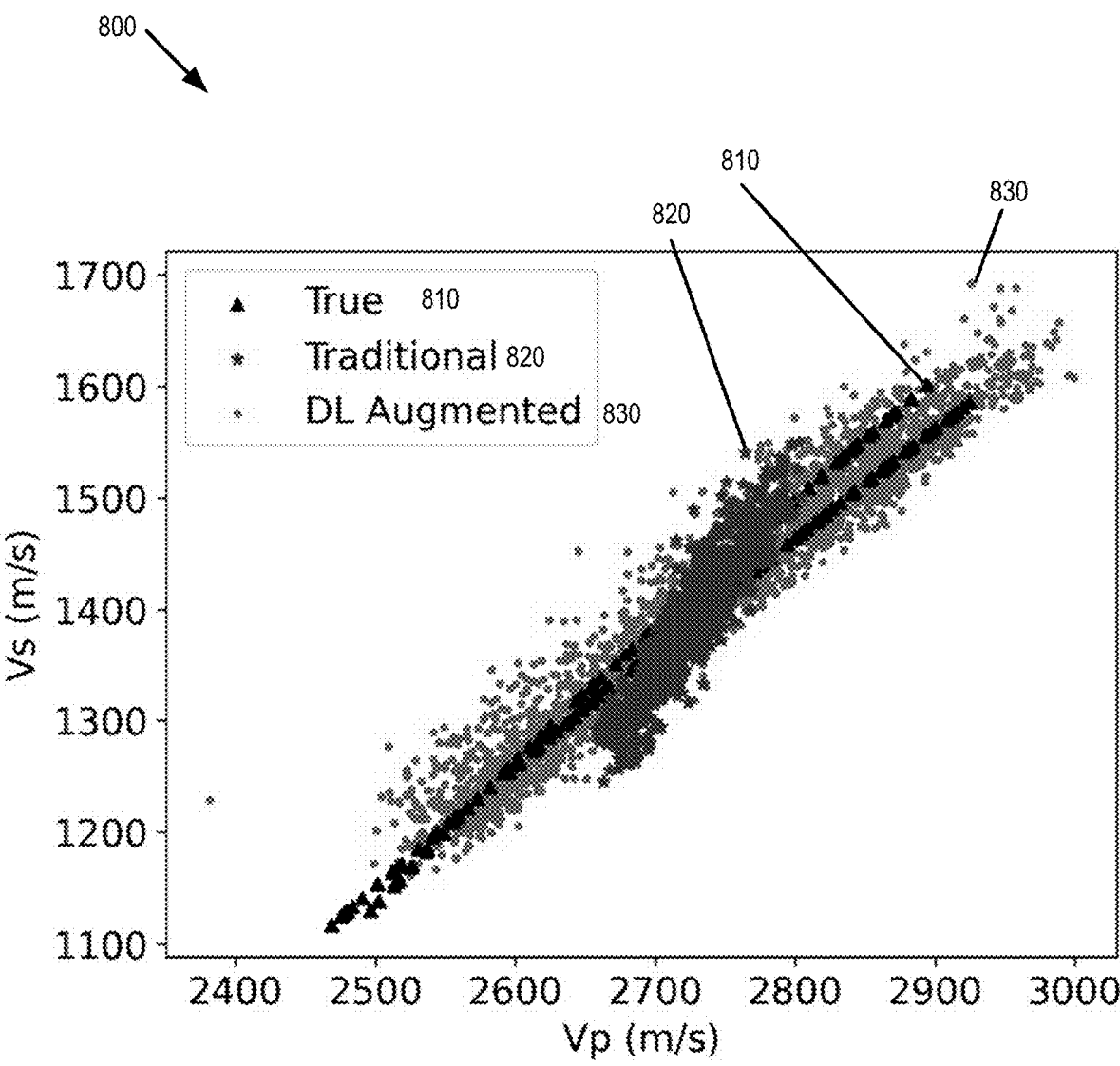
FIG. 8 illustrates a pixel-level Vp-Vs scatter plot.

In addition, FIG. 8 illustrates a graph 800 of the cross-plots of Vp-Vs values of the true model 810, the traditional inversion result 820, and the ML-augmented inversion result 830. As shown in FIG. 8, the distribution of the Vp-Vs values are closer to the ground truth from the augmented inversion result 830, while the traditional inversion result 820 may be on a wrong trend.

In practice, due to the memory constraint of GPU hardware, a single CNN may only map to a section or patch of moderate dimensionality (one million pixels). To address this practical issue, a patch stitching mechanism may be used with multi-resolution Laplacian pyramid decomposition (Anderson, et., al, 1984), which may blend patches at each individual scale to minimize edge artifacts. This stitching operation may be fully differentiable, so that back-propagation is naturally enabled. Another benefit of such a patch-based inversion is from the training process. In particular, such an approach may require structurally (e.g., geometrically) less complex training examples and fewer computational resources to train on small patches than whole images (e.g., whole images may be structurally (or geometrically) more complex than patches drawn from the entire image). Regardless, working with patches may help to parallelize inversion with multiple GPUs, thereby accelerating the inversion process.

Figure 6:
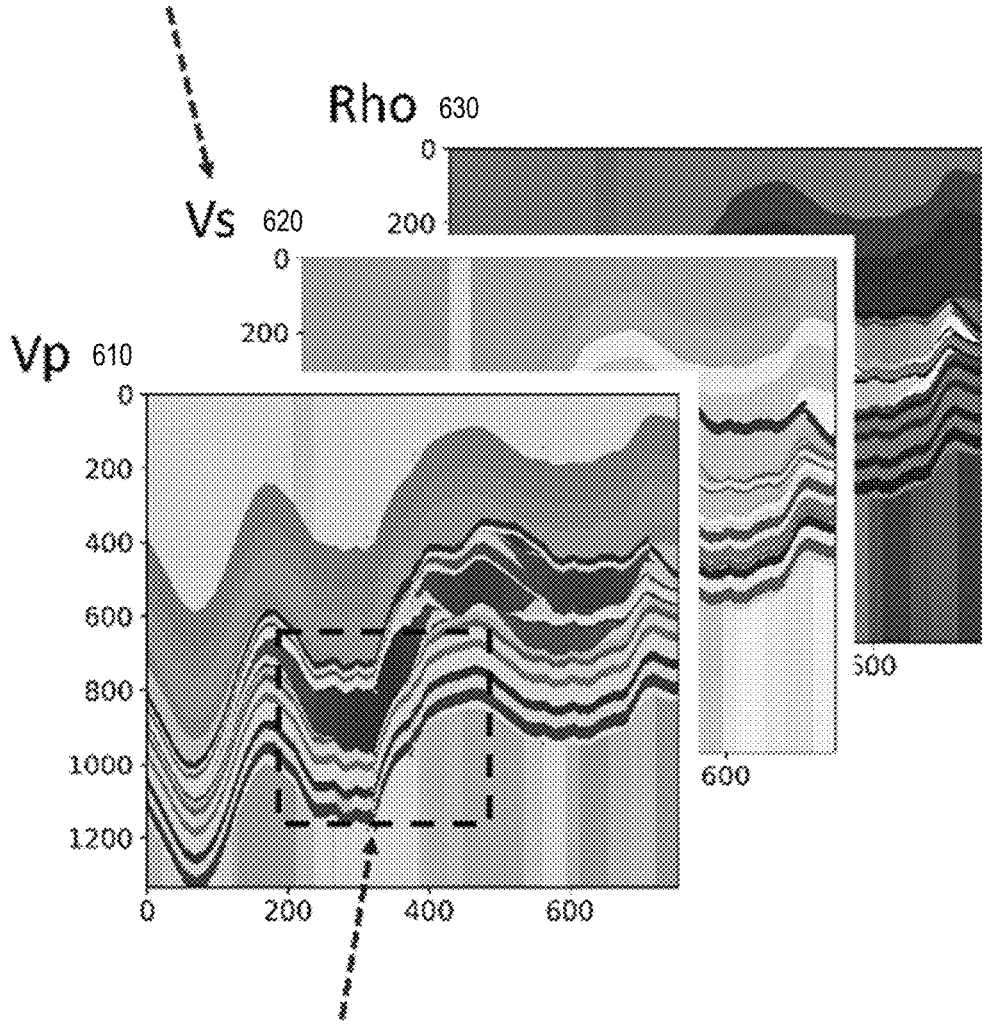
FIG. 6 illustrates patches of three channels for training (including Vp, Vs, Rho).

The training data may come from multiple sources including any one, any combination, or all of: (1) synthetic models consistent with the observations from wells from stratigraphic zones or analogs; (2) previously constructed geo-models for the stratigraphic zone or analog ones; or (3) model augmentations. As shown in the illustration 600 in FIG. 6, one single training patch has three channels: Vp 610, Vs 620, and Rho (ρ) 630, so as to enforce structural relationships across those three attributes and impose priors of petrophysical relationship that are interlinked with structure priors. This type of prior is hardly possible to realize with conventional regularization methods.

As discussed above, scenario testing workflow may be used to reduce and/or manage uncertainty in inversion results. Specifically, the sub-seismic prior information acquired from machine learning may contribute to refining scenarios and reducing ambiguity as well. Merely by way of example, certain relevant applications are to perform any one, any combination, or all of: distinguishing lobe systems and channel systems; testing fluid presence and fluid type; or determining fluid contact surfaces in a geological reservoir section, etc.

Figure 9:
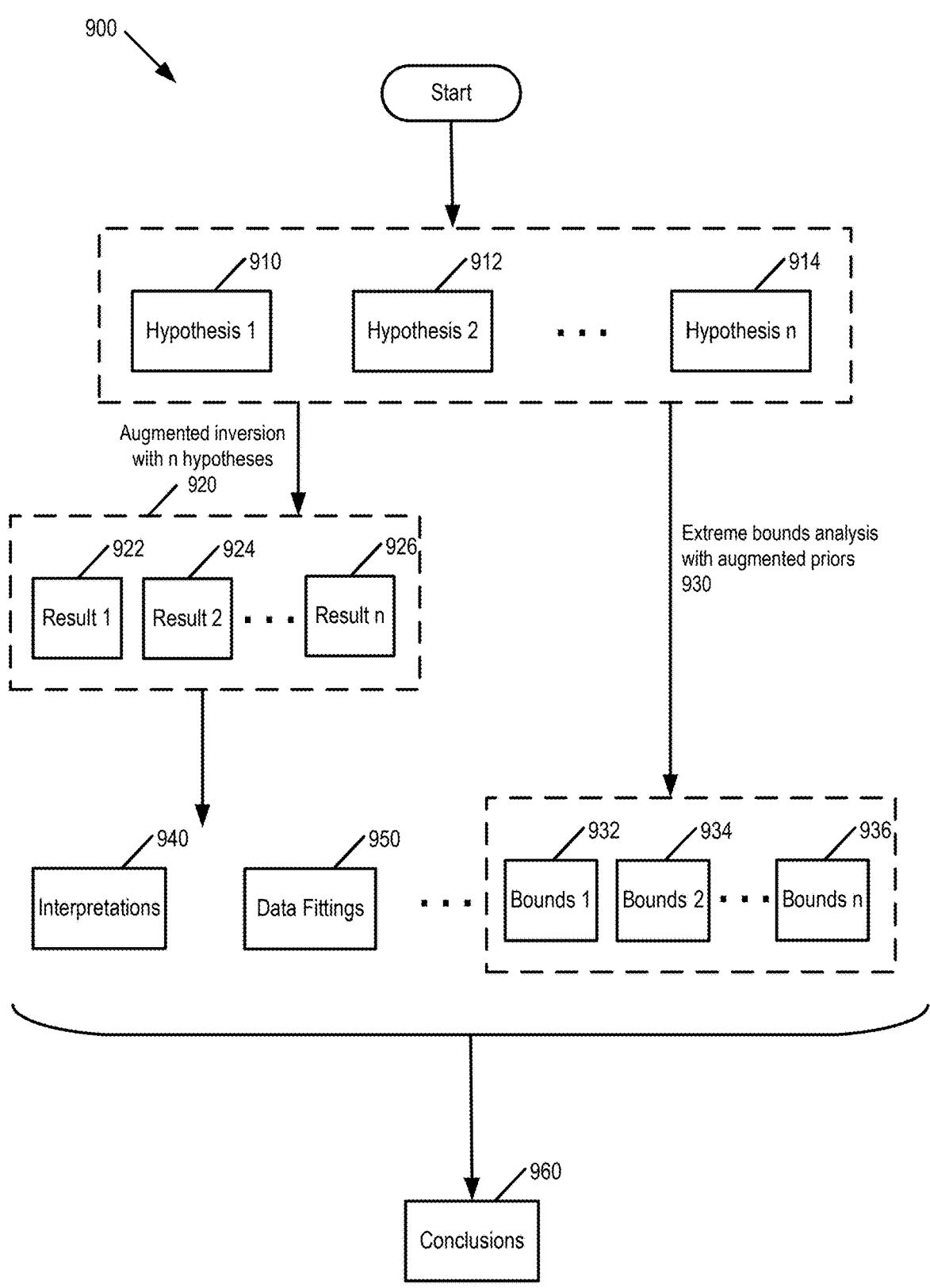
FIG. 9 illustrates a workflow for scenario testing.

Thus, in one or some embodiments, to further assess the uncertainty of the augmented inversion result, the workflow 900 illustrated in FIG. 9 may be used to perform scenario testing. As discussed above, scenario testing may be performed on inversion results in order to manage uncertainty. In one or some embodiments, the different scenarios may be engineered for uncertainty quantification. Further, the probability of the different scenarios may be determined by the scenario testing. Various uncertainty analyses are contemplated. As one example, the uncertainty of the different scenarios of the model at each spatial location may be evaluated by optimization. As another example, the uncertainty of models in a given scenario may be evaluated by latent space projection and interpolation. As still another example, the uncertainty of models in a given scenario may be evaluated by extreme bounds analysis, discussed below.

First, an interested region or geophysical anomaly may be defined or circled, and n possible scenarios (such as hypothesis 1 (910), hypothesis 2 (912) . . . hypothesis n (914)). At 920, n separate augmented inversions may be conducted. In one or some embodiments, the n separate augmented inversions may be conducted in combination with one or more other inversions with associated results (e.g., result 1 (922), result 2 (924) . . . result n (926)), such as a previous inversion with different labels as conditions. Further, in one or some embodiments, bound analysis may be performed. In one example, extreme bound analysis with augmented priors 930 may be performed in which multiple bounds, such as n bounds (e.g., bound 1 (932), bound 2 (934) . . . bound n (936)), may be used. In one particular example, the bounds may include upper and/or lower bounds of the region or anomaly for one, some, or each of bound 1 (932), bound 2 (934) . . . bound n (936). The extreme-bounds analysis may thus determine the upper bound and/or lower bound of an interested region by solving two optimization problems, which may be based on the disclosure in US Patent Application Publication No. 2020/0183046A1, incorporated by reference herein in its entirety.

At 940, interpretations of the series of augmented inversion results may be performed, and at 950 data fittings (including data misfit, see, for example, U.S. Pat. No. 10,416,348 B2, incorporated by reference herein in its entirety) may be examined. Further, the series of augmented inversion results may be checked against the bounds, such as bound 1 (932), bound 2 (934) . . . bound n (936). Data fitting and/or bound checking may produce an indicator (such as a statistical indicator of data fit or bound check). Finally, at 960, the methodology may draw conclusions on the likelihood of different scenarios, such as based on the data fittings and/or based on the check of the augmented inversion results against the bounds (e.g., analyze one or both of the data fit indicator or the bound check indicator to rank the results in order to determine a most likely scenario).

In addition to testing scenarios provided by domain experts and subsurface anomaly detection tools, the uncertainty quantification may include automatic null-space exploration, which is defined to generate equally-likely model solutions. This is based on the prior art of Hamiltonian Nullspace Shuttle (Fichtner and Zunino, 2019), combining the machine-learning augmentation in the disclosed methodology. Based on the formulation of an inverse problem, the Hamiltonian Nullspace Shuttle constructs a Hamiltonian system comprising a potential energy term that characterizes the loss function of the inverse problem, and a kinematic energy term where an artificial momentum is engineered and used to propagate a solution possibly obtained by the disclosed augmented inversion along a trajectory where the potential energy is guaranteed to be smaller than a pre-defined threshold, so that the trajectory explores the null-space of the original inverse problem. Alternatively, the nullspace search algorithm may be according to Hamiltonian Monte Carlo, which may comprise a Markov chain Monte Carlo method for obtaining a sequence of random samples which converge to being distributed according to a target probability distribution for which direct sampling is difficult.

In one or some embodiments, the selected nullspace search algorithm (e.g., either the Hamiltonian Nullspace Shuttle or the Hamiltonian Monte Carlo) may be combined with the disclosed machine-learning augmentation techniques, where exploration is performed using latent space vectors rather than model space parameters as in the prior art, ensuring more efficient, meaningful, and robust null-space exploration. In this way, the augmented inversion may be combined with a nullspace search algorithm to find equally-likely or almost equally-likely solutions connected to the one or more solutions. Further, the null-space exploration may or may not be conditioned on scenarios.

Alternatively, or in addition to scenario testing, the methodology may estimate the posterior distributions of one or more model parameters, including any one, any combination, or all of rock properties, rock-type labels, and wavelets, in the framework of variational inference.

Viewed from the physics perspective, the forward modeling f maps from the model space $\mathcal{M}$ to data space $\mathcal{D}$. With the neural network augmentation, the model space vector may be represented using an additional decoder g that maps from the latent space $\mathcal{Z}$ to $\mathcal{M}$. The inversion problem may thus be focused on finding the latent space vector $\mathcal{Z}$ from the data $\mathcal{D}$. Alternatively, it is contemplated that neural-network augmentation is not used. In that instance, the latent space is equal to the model space. For simplicity, latent space $\mathcal{Z}$ may be used herein. Also, the latent space $\mathcal{Z}$ may include both rock properties and wavelets.

Using the variational inference framework, one may obtain:

$$\log p(d) = \int q(z)\log\frac{p(d, z)}{q(z)}dz - \int q(z)\log\frac{p(z|d)}{q(z)}dz = \tag{4}$$

$$\mathbb{E}_{z\sim q(z;\phi)}\log\frac{p(d, z)}{q(z;\phi)} - \mathbb{E}_{z\sim q(z;\phi)}\log\frac{p(z|d)}{q(z;\phi)}$$

One task may comprise finding the distribution of z parametrized by $\phi$ that minimizes its Kullback-Leibler (KL)-divergence from the posterior distribution p(z|d). Since log(d) may be a constant, this may be equal to maximizing the evidence lower bound (ELBO):

$$\mathrm{argmin}_\phi \mathbb{E}_{z\sim q(z;\phi)}[-\log\ p(d,z)+q(z;\phi)] \tag{5}$$

One may consider two additional issues. First, q(z; $\phi$) is typically of simple forms, such as the Gaussian distribution, in order to make the sampling and optimization tractable. However, such a simple distribution may be difficult to approximate the posterior. Alternatively, Normalizing Flows may be used to transform from a simple distribution to a complex one: z=h(z$_0$; $\theta$). It is noted that the normalizing flow may be different from the one used in augmented inversion discussed in previous sections. Here, the normalizing flow may be calibrated or trained in the optimization process, while the previous one may be pre-trained on examples before the inversion). In other words:

$$\log q(z) = \log q(z_0) - \log\det\left(\left\|\frac{\partial h}{\partial z_0}\right\|\right), \tag{6}$$

where q(z$_0$)~$\mathcal{N}$ (0, I). The new inference problem may be written as:

$$\mathrm{argmin}_\theta \mathbb{E}_{z_0\sim q(z_0)}\left[-\log p\big(d, h(z_0;\theta)\big) + q(z_0) - \log\det\left(\left\|\frac{\partial h(z_0;\theta)}{\partial z_0}\right\|\right)\right] \tag{7}$$

Second, in the pre-training of decoders, the knowledge of different scenarios may be available. Thus, the generation may also be conditioned on the scenario code c; that is, m=g(z, c). As a result, random variable c may be incorporated into this inference framework. Hence, the original problem described above may become:

$$\log p(d) = \int q(z, c)\log\frac{p(d, z, c)}{q(z, c)}dzdc - \int q(z, c)\log\frac{p(z, c|d)}{q(z, c)}dzdc \tag{8}$$

In one or some embodiments, z and c may be presumed to be independent, resulting in solving the following problem:

$$\mathrm{argmin}_{\theta,\phi}\mathbb{E}_{z_0\sim q(z_0),c\sim q(c;\phi)}\left[-\log p\big(d, h(z_0;\theta), c\big) + \tag{9}\right.$$

-continued $$q(z_0) - \log\det\left(\left|\frac{\partial h(z_0;\theta)}{\partial z_0}\right|\right) + q(c;\phi)\right]$$

One special case of interest may comprise fining the most likely z and perform uncertainty management on c. In this case, one may assume that z follows a delta distribution $z \sim \delta(z-\tilde{z})$. As such, equation (9) may become:

$$\text{argmin}_{\tilde{z},\phi}\mathbb{E}_{c \sim q(c;\phi)}[-\log p(d,\tilde{z},c)+q(c;\phi)] \qquad (10)$$

The scenario code $c_{i,j}$ at each location (i, j) may take K values. If $c_{i,j}=k$, this may be encoded by a vector where only the k-th entry is 1, and has value 0 elsewhere, which may be termed the "one-hot" encoding. Therefore, the scenario code may be represented as a cube of 0 and 1 values.

It is noted that the scenario code c may only take discrete values. In this regard, the "straight-through" gradient may be used. Also, Gumbel-softmax reparameterization trick may be used to sample c, so that the gradient may be computed with respect to the parameters of discrete distributions.

$$c^{hard} = \text{one\_hot}\left(\text{argmax}_i[g_i + \log\pi_i]\right) \qquad (11)$$

$$c_i^{soft} = \frac{\exp((\log\pi_i + g_i)/\tau)}{\sum_j^K \exp((\log\pi_i + g_i)\tau)}, i = 1, \dots, K. \qquad (12)$$

$$c = \text{stop\_gradient}\left(c^{hard} - c^{soft}\right) + c^{soft} \qquad (13)$$

With the calibrated $\theta$ and c, the methodology may generate numerous model parameters, such as by sampling the standard normal distribution and feedforward the normalizing flow and the decoder. With the generated examples, a quantity of interest, such as any one, any combination, or all of model mean, model variance, and quantiles, may be estimated.

Figure 10:
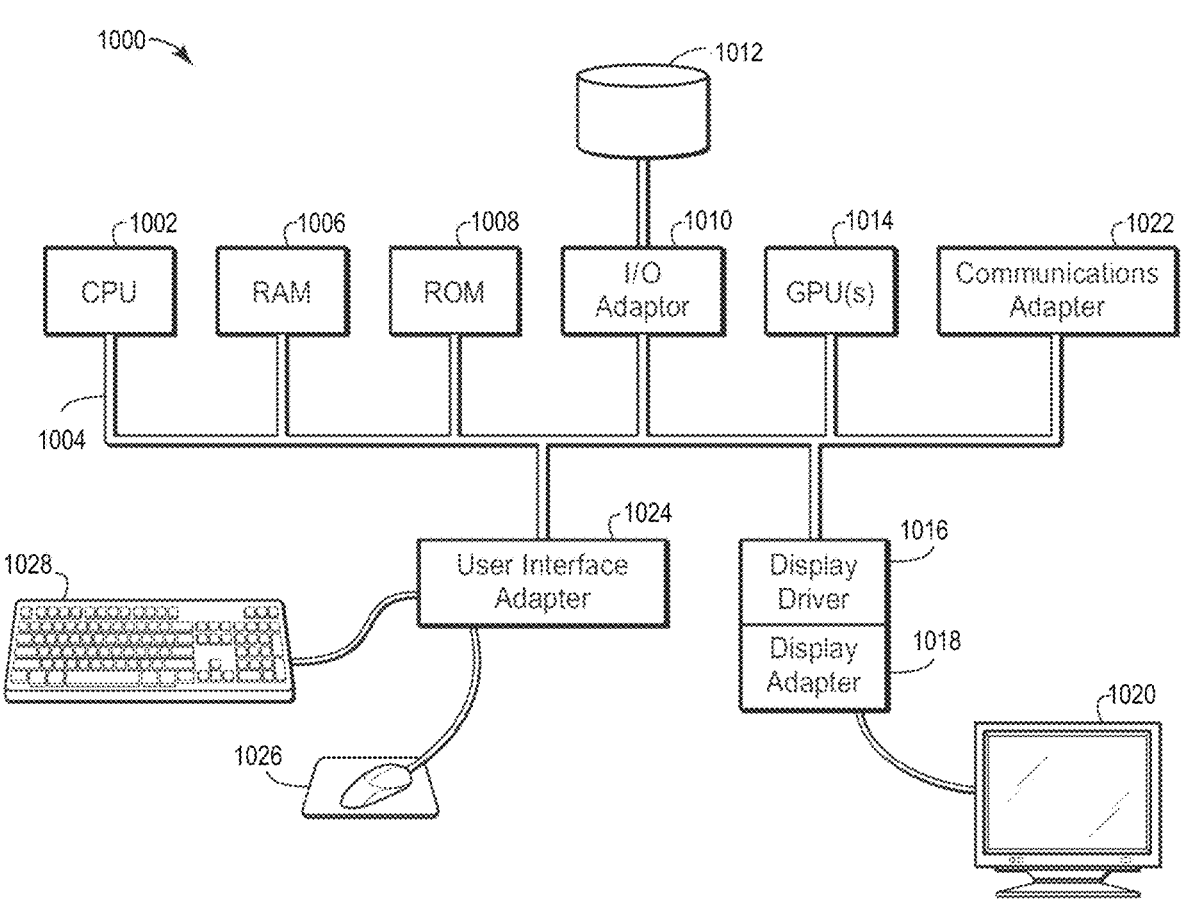
FIG. 10 is a diagram of an exemplary computer system that may be utilized to implement the methods described herein.

In all practical applications, the present technological advancement must be used in conjunction with a computer, programmed in accordance with the disclosures herein. For example, FIG. 10 is a diagram of an exemplary computer system 1000 that may be utilized to implement methods described herein. A central processing unit (CPU) 1002 is coupled to system bus 1004. The CPU 1002 may be any general-purpose CPU, although other types of architectures of CPU 1002 (or other components of exemplary computer system 1000) may be used as long as CPU 1002 (and other components of computer system 1000) supports the operations as described herein. Those of ordinary skill in the art will appreciate that, while only a single CPU 1002 is shown in FIG. 10, additional CPUs may be present. Moreover, the computer system 1000 may comprise a networked, multi-processor computer system that may include a hybrid parallel CPU/GPU system. The CPU 1002 may execute the various logical instructions according to various teachings disclosed herein. For example, the CPU 1002 may execute machine-level instructions for performing processing according to the operational flow described.

The computer system 1000 may also include computer components such as non-transitory, computer-readable media. Examples of computer-readable media include computer-readable non-transitory storage media, such as a random-access memory (RAM) 1006, which may be SRAM, DRAM, SDRAM, or the like. The computer system 1000 may also include additional non-transitory, computer-readable storage media such as a read-only memory (ROM) 1008, which may be PROM, EPROM, EEPROM, or the like. RAM 1006 and ROM 1008 hold user and system data and programs, as is known in the art. The computer system 1000 may also include an input/output (I/O) adapter 1010, a graphics processing unit (GPU) 1014, a communications adapter 1022, a user interface adapter 1024, a display driver 1016, and a display adapter 1018.

The I/O adapter 1010 may connect additional non-transitory, computer-readable media such as storage device(s) 1012, including, for example, a hard drive, a compact disc (CD) drive, a floppy disk drive, a tape drive, and the like to computer system 1000. The storage device(s) may be used when RAM 1006 is insufficient for the memory requirements associated with storing data for operations of the present techniques. The data storage of the computer system 1000 may be used for storing information and/or other data used or generated as disclosed herein. For example, storage device(s) 1012 may be used to store configuration information or additional plug-ins in accordance with the present techniques. Further, user interface adapter 1024 couples user input devices, such as a keyboard 1028, a pointing device 1026 and/or output devices to the computer system 1000. The display adapter 1018 is driven by the CPU 1002 to control the display on a display device 1020 to, for example, present information to the user such as subsurface images generated according to methods described herein.

The architecture of computer system 1000 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1000 may include various plug-ins and library files. Input data may additionally include configuration information.

Preferably, the computer is a high-performance computer (HPC), known to those skilled in the art. Such high-performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the AI model in one or more aspects of hydrocarbon management. For instance, methods according to various embodiments may include managing hydrocarbons based at least in part upon the one or more generated AI models and data representations constructed according to the above-described methods. In particular, such methods may include performing various welds in the context of drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

REFERENCES

The following references are hereby incorporated by reference herein in their entirety, to the extent they are consistent with the disclosure of the present invention:

LeCun, Y., Bengio, Y., & Hinton, G., "Deep Learning.", Nature 521, 436-444, (2015).

Simonyan, K., & Zisserman, A., "Very Deep Convolutional Networks for Large-Scale Image Recognition.", arXiv technical report (2014).

Jonathan Long, Evan Shelhamer, and Trevor Darrell, "Fully Convolutional Networks for Semantic Segmentation," CVPR (2015).

Olaf Ronneberger, Philipp Fischer, Thomas Brox, "U-Net: Convolutional Networks for Biomedical Image Segmentation", Medical Image Computing and Computer-Assisted Intervention (MICCAI), Springer, LNCS, Vol. 9351: 234-241 (2015).

Zhang, C., Frogner, C., & Poggio, T., "Automated Geophysical Feature Detection with Deep Learning." GPU Technology Conference (2016).

Jiang, Y., Wulff, B., "Detecting prospective structures in volumetric geo-seismic data using deep convolutional neural networks.", Poster presented on Nov. 15, 2016 at the annual foundation council meeting of the Bonn-Aachen International Center for Information Technology (b-it) (2016).

J. Mun, W. D. Jang, D. J. Sung and C. S. Kim, "Comparison of objective functions in CNN-based prostate magnetic resonance image segmentation," 2017 IEEE International Conference on Image Processing (ICIP), Beijing, 2017, pp. 3859-3863 (2017).

K. H. Zou, S. K. Warfield, A. Bharatha, C. M. C. Tempany, M. R. Kaus, S. J. Haker, W. M. Wells III, F. A. Jolesz, R. Kikinis "Statistical validation of image segmentation quality based on a spatial overlap index" Acad. Radiol., 11 (2), pp. 178-189 (2004).

I. J. Goodfellow, J. Pouget-Abadie, M. Mirza, B. Xu, D. Warde-Farley, S. Ozair, A. C. Courville, and Y. Bengio. Generative adversarial nets. In Proceedings of NIPS, pages 2672-2680 (2014).

Marc G Bellemare, Ivo Danihelka, Will Dabney, Shakir Mohamed, Balaji Lakshminarayanan, Stephan Hoyer, and Rémi Munos, "The Cramer Distance as a Solution to biased Wasserstein Gradients", arXiv:1705.10743 (2017).

A. Veillard, O. Morère, M. Grout and J. Gruffeille, "Fast 3D Seismic Interpretation with Unsupervised Deep Learning: Application to a Potash Network in the North Sea", EAGE, (2018).

Cooke, D. A., & Schneider, W. A., "Generalized linear inversion of reflection seismic data", Geophysics, 48(6), 665-676 (1983).

Helgesen, J., & Landrø, M., "Estimation of Elastic Parameters From AVO Effects In The Tau-P Domain1", Geophysical Prospecting, 41(3), 341-366 (1993).

Simmons Jr, J. L, & Backus, M. M., "Waveform-based AVO inversion and AVO prediction-error", Geophysics, 61(6), 1575-1588 (1996).

Lörtzer, G. J. M., & Berkhout A. J., "An integrated approach to lithologic inversion—Part I: Theory", Geophysics, 57(2), 233-244 (1992).

Pan, G. S., Young, C. Y., & Castagna, J. P., "An integrated target-oriented prestack elastic waveform inversion: Sensitivity, calibration, and application", Geophysics, 59(9), 1392-1404 (1994), Martinez, et al., "Complex Reservoir Characterization by Multiparameter Constrained inversion, Reservoir Geophysics", ed. By Sheriff, 224-234 (1992).

J. Brac, et al., "Inversion with a priori information: an approach to integrated stratigraphic interpretation, Reservoir Geophysics", ed. Sheriff, p 251-258 (1992).

Landrø, M., Buland, A., & d'Angelo, R., "Target-oriented AVO inversion of data from Valhall and Hod fields", The Leading Edge, 14(8), 855-861 (1995).

Rimstad, K., Avseth, P., & Omre, H., "Hierarchical Bayesian lithology/fluid prediction: A North Sea case study", Geophysics, 77(2), B69-B85 (2012).

Gunning, J., Kemper, M., Saussus, D., Pelham, A., & Fitzgerald, E., "A tour of optimisation methods for facies estimation in AVO seismic inversion using Markov random fields", In Proc., 75th EAGE Conference and Exhibition (2013, January).

Bosch, M., Mukerji, T., & Gonzalez, E. F., "Seismic inversion for reservoir properties combining statistical rock physics and geostatistics: A review", Geophysics, 75(5), 75A165-75A176 (2010).

Delprat-Jannaud F. and Lailly P., "A fundamental limitation for the reconstruction of impedance profiles from seismic data", Geophysics 70(1), R1-R14 (2005).

Pratt R. G., "Seismic waveform inversion in the frequency domain, Part I", Geophysics 64, 888-901 (1999).

Shipp R. and Singh S., "Two-dimensional full wavefield inversion of wide aperture marine seismic streamer data", Geophysical Journal International 151(2), 325-344 (2002).

Rickett J., "The variable projection method for waveform inversion with an unknown source function, Geophysical Prospecting", 61, 874-881 (2013).

Wang K., Krebs J. R., Hinkley D. and Baumstein A., "Simultaneous full-waveform inversion for source wavelet and earth model. 79th Annual international Meeting", SEG, Expanded Abstracts 28, 2537-2541 (2009).

Adelson, Edward H., et al. "Pyramid methods in image processing." RCA engineer 29.6 (1984): 33-41.

Fichtner, Andreas, and Andrea Zunino. "Hamiltonian null space shuttles." Geophysical research letters 46.2 (2019): 644-651.

What is claimed is:

1. A computer-implemented method of performing geophysical inversion comprising:

performing a training step independent of measured data for a subsurface region to generate a machine-learned model, the training step using direct probabilistic modeling of geologic priors of at least one aspect of rock types, facies, or fluid types thereby tailoring the machine-learned model to the at least one aspect of rock types, facies, or fluid types;

accessing the measured data for the subsurface region;

solving an inversion problem by:

(i) inputting the measured data and an initial solution using the machine-learned model tailored in the at least one aspect to rock types, facies, or fluid types;

(ii) generating an inversion solution based on the measured data and the initial solution tailored in the at least one aspect to the rock types, the facies or the fluid types;

(iii) determining whether to continue iterating;

(iv) responsive to determining to continue iterating, iterating back to (ii) to generate the inversion solution that is updated and based on the measured data and the initial solution; and responsive to determining not to continue iterating, drilling a well or extracting hydrocarbons from the well using the inversion solution tailored in the at least one aspect to the rock types, the facies or the fluid types.

2. The method of claim 1, wherein solving the inversion problem tailored in the at least one aspect to the rock types, the facies, or the fluid types comprises conditioning inversion based on scenarios of the rock types, the facies, or the fluid types; and wherein the conditioning of the inversion is based on the scenarios of at least one of the rock types, the facies, or the fluid types obtained from seismic processing tools independent from priors based on knowledge bases and upstream to the inversion.

3. The method of claim 1, wherein solving the inversion problem tailored in the at least one aspect to at least one of the rock types, the facies or the fluid types comprises generating a function (f) that maps from latent space Z into parameter space of subsurface properties tailored to the rock types, the facies, or the fluid types.

4. The method of claim 1, further comprising accessing prior subsurface data;

wherein the prior subsurface data comprises rock types scenarios or facies scenarios;

wherein the machine-learned model comprises an augmented forward model based on machine-learning with the rock types scenarios or the facies scenarios; and wherein solving the inversion problem is augmented based on the machine-learned model for the rock types or the facies scenarios.

5. The method of claim 1, wherein determining whether to continue iterating is based on the machine-learned model.

6. The method of claim 5, wherein the machine-learned model by:

comparing a solution generated by the machine-learned model with the inversion solution; and determining whether to continue iterating based on the comparison.

7. The method of claim 1, wherein the measured data and the initial solution are separately input to generate the inversion solution.

8. The method of claim 1, wherein the machine-learned model generates a plurality of distinct and separate initial solutions;

wherein a plurality of iterative solutions are generated by solving the inversion problem based on the plurality of distinct and separate initial solutions; and wherein the machine-learned model is used to evaluate the plurality of iterative solutions to determine whether to continue iterating.

9. The method of claim 1, wherein performing the training step consists of using training examples.

10. The method of claim 9, wherein the training examples comprise one or more rock type distributions or one or more geophysical property distributions.

11. A computer-implemented method of machine learning-augmented geophysical inversion comprising:

accessing measured data for a subsurface region;

accessing prior subsurface data;

accessing conditioning data;

forming an augmented forward model independent of the measured data for the subsurface region based on:

a machine-learning model representing the prior subsurface data conditioned with the conditioning data, and a physics model mapping output of the machine-learning model to seismic data thereby interlinking a direct physical relationship of at least one of rock types, facies, or fluid types with the seismic data;

initializing, using the augmented forward model, a plausible model by sampling latent space of a priori network model;

solving an inversion problem by:

(i) inputting the measured data and the plausible model using the augmented forward model tailored in the at least one aspect to rock types, facies, or fluid types;

(ii) generating, based on the measured data and the plausible model, one or more solutions which are consistent with the seismic data, the prior subsurface data and the conditioning data;

(iii) determining whether to continue iterating;

(iv) responsive to determining to continue iterating, iterating back to (ii) to generate the one or more solutions that is updated and based on the measured data and the plausible model; and responsive to determining not to continue iterating, drilling a well or using the well to extract hydrocarbons using the one or more solutions.

12. The method of claim 11, wherein a distribution of latent space vectors is based on a normal distribution during the inversion, such that solving the inversion problem traverses within a subspace of high-resolution plausible subsurface models with augmentation from the α priori network model.

13. The method of claim 11, wherein solving the inversion problem based on multiple scenarios generates multiple solutions; and wherein the machine-learning model evaluates the multiple solutions in order to rank the multiple scenarios.

14. The method of claim 11, wherein an augmented inversion method is combined with a nullspace search algorithm to find equally-likely or almost equally-likely solutions connected to the one or more solutions.

15. The method of claim 11, wherein the physics model associates geometric shapes of geobodies with geophysical or petrophysical properties; and wherein the physical model associates shapes of channel systems and of lobe systems with their respective properties.

16. A computer-implemented method of machine learning-augmented geophysical inversion comprising:

obtaining measured data for a subsurface region;

obtaining prior subsurface data;

performing a training step independent of the measured data for the subsurface region using direct probabilistic modeling of geologic priors of at least one aspect of rock types, facies, or fluid types to generate an augmented forward model based on machine-learning with the prior subsurface data conditional on scenarios of at least one of geologic systems, rock types, facies, or fluid types;

solving an inversion problem by:

(i) inputting the measured data and different rock distributions as different initial solutions using the augmented forward model, wherein different conditions of at least one of rock types, facies, or fluid types are used as inputs to the augmented forward model in order for the augmented forward model to generate the different rock distributions;

(ii) generating multiple scenario solutions based on the measured data and the different initial solutions;

(iii) determining whether to continue iterating;

(iv) responsive to determining to continue iterating, iterating back to (ii) to generate the multiple scenario solutions that are updated and based on the measured data and the different initial solutions;

responsive to determining not to continue iterating, testing at least one of the multiple scenario solutions; and drilling a well or using the well to extract hydrocarbons using the at least one of the multiple scenario solutions.

17. The method of claim 16, wherein testing the at least one of the multiple scenario solutions comprises one of:

using the augmented forward model in order to evaluate the multiple scenario solutions; or evaluating a loss function using the measured data for a subsurface region.

18. The method of claim 16, wherein the at least one of the multiple scenario solutions comprises a model; and further comprising:

creating a map of categorical labels or probabilities of scenarios for each pixel or element in the model; and creating, by the augmented forward model, examples that match the labels.

19. The method of claim 16, wherein uncertainty of the multiple scenario solutions at each spatial location is evaluated by optimization.

20. The method of claim 16, wherein uncertainty of the at least one of the multiple scenario solutions is evaluated by at least one of:

latent space projection and interpolation; or extreme bounds analysis.

21. A computer-implemented method of machine learning-augmented geophysical inversion comprising:

obtaining measured data for a subsurface region;

obtaining prior subsurface data;

forming an augmented forward model based on machine-learning with the prior subsurface data conditional on scenarios of at least one of geologic systems, rock types or facies and on a physics model mapping output of the augmented forward model to seismic data thereby interlinking a direct physical relationship of at least one of rock types, facies, or fluid types with seismic data;

using an augmented inversion method combined with a Hamiltonian null-space exploration problem to find multiple equally plausible solutions, wherein the augmented inversion method comprises:

(i) inputting the measured data and different rock distributions as different initial solutions (ii) generating multiple scenario solutions based on the measured data and the different initial solutions, wherein the Hamiltonian null-space exploration problem using the multiple scenario solutions in order to find the multiple equally plausible solutions;

drilling a well or using the well to extract hydrocarbons using the at least one of the multiple equally plausible solutions.

22. A computer-implemented method for simultaneously estimating wavelets and geophysical or petrophysical properties, the method comprising:

performing a training step independent of measured data for a subsurface region to generate an augmented forward model based on machine-learning with wavelet examples in order to determine representations in latent space;

accessing the measured data for a subsurface region;

solving an inversion problem by:

(i) estimating, based on different conditions input to the augmented forward model and without a well-log calibration, a plurality of initial wavelets;

(ii) estimating, based on the measured data, initial geophysical or petrophysical properties;

(iii) generating an inversion solution by simultaneously updating the plurality of initial wavelets and the initial geophysical or petrophysical properties;

(iv) determining whether to continue iterating;

V responsive to determining to continue iterating, iterating back to (iii); and drilling a well or using the well to extract hydrocarbons using the inversion solution.

23. The method of claim 22, wherein the initial wavelets are estimated based on statistical wavelet estimations, elastic FWI results, or transferred from overlapping or nearby seismic surveys with well ties; and wherein the initial wavelets comprise a distribution of wavelets as a prior to infer wavelets during the solving of the inversion problem.

24. The method of claim 22, wherein solving the inversion problem comprises inverting for wavelets by updates in the latent space of a wavelet network.

* * * * *